United States Patent
Yasuda et al.

(10) Patent No.: US 12,533,634 B2
(45) Date of Patent: Jan. 27, 2026

(54) HYDROGEN ISOTOPE CONCENTRATING APPARATUS

(71) Applicant: JAPAN ATOMIC ENERGY AGENCY, Tokai-mura (JP)

(72) Inventors: Satoshi Yasuda, Tsukuba (JP); Hidehito Asaoka, Tokai-mura (JP); Hisayoshi Matsushima, Sapporo (JP)

(73) Assignee: JAPAN ATOMIC ENERGY AGENCY, Tokai-mura (JP)

( * ) Notice: Subject to any disclaimer, the term of this patent is extended or adjusted under 35 U.S.C. 154(b) by 895 days.

(21) Appl. No.: 17/691,807

(22) Filed: Mar. 10, 2022

(65) Prior Publication Data
US 2022/0288532 A1  Sep. 15, 2022

(30) Foreign Application Priority Data

Mar. 12, 2021 (JP) .................................. 2021-039878
Mar. 12, 2021 (JP) .................................. 2021-039879

(51) Int. Cl.
*B01D 59/40* (2006.01)
*C01B 3/58* (2006.01)
(Continued)

(52) U.S. Cl.
CPC .............. *B01D 59/40* (2013.01); *C01B 3/58* (2013.01); *H01M 4/8657* (2013.01);
(Continued)

(58) Field of Classification Search
None
See application file for complete search history.

(56) References Cited

U.S. PATENT DOCUMENTS

| | | | |
|---|---|---|---|
| 10,926,228 B2 * | 2/2021 | Lozada | B01D 67/00791 |
| 2014/0034116 A1 * | 2/2014 | Zuppero | B01J 19/126 |
| | | | 422/186 |

(Continued)

FOREIGN PATENT DOCUMENTS

| WO | 2017017433 A2 | 2/2017 |
|---|---|---|
| WO | 2018049343 A1 | 3/2018 |

OTHER PUBLICATIONS

Studies on the separation of Hydrogen Isotopes Including Tritium by Palladium Alloy Membranes, Suzuki, Yasuo; Kimura, Shoji (See attached explanation).

(Continued)

*Primary Examiner* — Jennifer Dieterle
*Assistant Examiner* — Phillip Y Shao
(74) *Attorney, Agent, or Firm* — Hawaii Patent Services; Nathaniel K. Fedde; Kenton N. Fedde

(57) ABSTRACT

To obtain deuterium in a gas state from a mixed gas of hydrogen and deuterium at a low cost.

A first electrode 11 is an electrode made of a metal allowing hydrogen (H component and D component) to permeate therethrough (hydrogen permeable metal), and the hydrogen permeable metal is Pd, for example. H ions and D ions having permeated through the first electrode 11 flow to the side of a second electrode 12 in a proton conduction layer 20. When the first electrode 11 is used as an anode and the second electrode 12 as a cathode, H ions and D ions flow in the proton conduction layer 20 from the left to the right in the drawing. In that case, hydrogen component in an input gas is more likely to flow into an atmosphere on the cathode side than deuterium component, and an H/D composition ratio accordingly becomes higher in a product gas than in the (Continued)

input gas. In an exhaust gas extracted after H and D components in the input gas are thus consumed, D component has been enriched.

9 Claims, 19 Drawing Sheets

(51) Int. Cl.
 *H01M 4/86* (2006.01)
 *H01M 4/88* (2006.01)
 *H01M 4/92* (2006.01)
 *H01M 16/00* (2006.01)

(52) U.S. Cl.
 CPC ........... *H01M 4/881* (2013.01); *H01M 4/921* (2013.01); *H01M 4/926* (2013.01); *H01M 16/003* (2013.01)

(56) References Cited

U.S. PATENT DOCUMENTS

| | | | |
|---|---|---|---|
| 2015/0001092 A1* | 1/2015 | Preston | C25B 15/02 |
| | | | 205/637 |
| 2016/0053387 A1* | 2/2016 | Kutchcoskie | C25B 9/70 |
| | | | 205/637 |
| 2016/0310898 A1* | 10/2016 | Denton | C02F 1/4672 |
| 2018/0071678 A1* | 3/2018 | Ludlow | B01D 59/40 |
| 2018/0311624 A1* | 11/2018 | Lozada | B01D 59/14 |
| 2020/0075964 A1 | 3/2020 | Mizutani et al. | |

OTHER PUBLICATIONS

Development of Low-Pt-Loaded Electrocatalyst for Polymer Electrolyte Fuel Cells, Fukazawa, Taishi; Mei, Wu; Suzuki, Naotoshi (See attached explanation).

* cited by examiner

HYDROGEN ISOTOPE CONCENTRATING APPARATUS

INCORPORATION BY REFERENCE

This application is based on and claims the benefit of priority from Japanese Patent Application No. 2021-039878 filed on Mar. 12, 2021 and No. 2021-039879 filed on Mar. 12, 2021, the entire contents of which are hereby incorporated by reference.

BACKGROUND

Technical Field

The present invention relates to a hydrogen isotope concentrating apparatus that selectively enriches/concentrates deuterium in a situation where hydrogen ($^1H$) and deuterium are present together.

Background Art

Stable hydrogen isotopes constituting naturally occurring water, hydrogen gas and the like include hydrogen $^1H$ (hereafter denoted as H) with a mass number of 1 (with its atomic nucleus consisting of only one proton) and deuterium $^2H$ (hereafter denoted as D) with a mass number of 2 (with its atomic nucleus consisting of one proton and one neutron), where the presence ratio of D is extremely smaller than that of H. While H and D have almost similar chemical properties, there are known applications where D is particularly effective, in the field of nuclear power and semiconductor manufacturing. Accordingly, there is a demand for a technology of selectively extracting (separating) specifically D from water and hydrogen gas, in which H and D are present together. However, since complete and instantaneous separation of H and D is substantially impossible, there is practically performed, on a substance containing them in a mixed state (water, hydrogen gas or the like), a process of increasing the concentration of either of them (particularly D), for the purpose of the separation.

Since H and D have almost similar chemical properties, they cannot be easily separated by chemical methods in general, and there is known a technology of separating them by using their difference in such characteristics as boiling point and vapor pressure. However, such a technology requires a high temperature, a cryogenic temperature, a complex process, an expensive chemical substance, and the like, and it accordingly is difficult to obtain D at a low cost. While there is known also a technology of separating H and D by using their difference in zero-point vibration energy or atomic size, a cryogenic environment is required also in this case, and it accordingly is difficult to obtain D at a low cost, similarly.

Further, as described in Non-Patent Document 1, there is known also a technology of separating H and D by using their difference in diffusion coefficient within a metal (such as Pd) that allows hydrogen to permeate it. This method can be easily realized with a simple configuration, compared with the chemical methods and the like described above, but it has a problem in that the metal used therein is embrittled by hydrogen. For reducing influence of the embrittlement, for example, it is effective to increase the thickness of the metal (such as Pd), and the increased thickness is set at a few hundred nm to a few tens of μm, for example. It is also effective to use the metal in the form of an alloy with another metals (such as Ag). However, in such cases, there arises problems in that the metal material becomes expensive, that the separation efficiency is reduced, and the like. In addition, performing this process at a high temperature is also effective, but it complicates the apparatus configuration. Furthermore, to enable hydrogen to permeate through the metal, it is also necessary to provide a pressure difference between the upstream and downstream sides between which the metal is arranged, which also requires a complex apparatus configuration.

On the other hand, Patent Document 1 describes a technology of separating H and D by using a membrane electrode assembly (MEA) that functions as a fuel cell. In the MEA, a proton conductor is sandwiched between electrodes (anode and cathode), hydrogen gas containing H and D is supplied to the anode side, and oxygen gas (atmosphere) is supplied to the cathode side. In this case, there occurs an action wherein positive H or D ions having been supplied from the anode side and been transmitted through the proton conductor react with oxygen on the cathode side, thereby producing water there and generating an electromotive force between the anode and cathode, which is an action reverse to that of water electrolysis. As the proton conductor, Nafion (registered trademark) or the like is used. There, to be more precise, $H_2$, HD and $D_2$ are present in the hydrogen gas supplied to the anode side, and the water generated on the cathode side is a mixture of $H_2O$, HDO and the like. In that case, owing to the difference between H and D ions in their conduction states and reaction rates within the proton conductor, HDO containing D becomes easier to be generated than $H_2O$ on the cathode side, so that D component is increased on the cathode side from that on the cathode side. In this technology, electrical power is generated by functioning as a fuel cell and D component enrichment/concentration is performed at the same time, and it accordingly is possible to reduce the power required for the enrichment, particularly.

In that case, an oxidation reaction and a reduction reaction occur on the anode and cathode sides, respectively, and the anode and the cathode are made of a material that functions as a catalyst for promoting the reactions. As such a material, noble metals including platinum (Pt) and ruthenium (Ru), and the like are used. Here, in a fuel cell, rather than densely forming the entire electrodes with Pt, higher efficiency is achieved by forming the electrodes with Pt fine particles being dispersed, because thereby the surface area of Pt serving in the catalytic reaction can be increased and it becomes easier to transport H ions and D ions in the proton conductor. Accordingly, as described in such as Non-Patent Document 2, a Pt/C electrode having a configuration in which Pt fine particles are dispersed in a carbon (C) sheet is particularly preferably used as the anode and the cathode in that case. With this technology, D component on the cathode side can be increased (enriched) from that on the anode side, and the enrichment/concentration of deuterium can be performed at a lower cost than when using the apparatus described in Non-Patent Document 1.

CITATION LIST

Non-Patent Literature

[Non-Patent Document 1] Yasuo Suzuki and Shoji Kimura, "Studies on the separation of hydrogen isotopes containing tritium by palladium alloy membranes" (in Japanese), SEISAN KENKYU, Vol. 36, No. 6, pp. 293-296 (June 1983).

[Non-Patent Document 2] Taishi Fukasawa, Wu Mei and Naotoshi Suzuki, "Development of low-Pt-loaded electrocatalyst for polymer electrolyte fuel cells" (in Japanese), Toshiba Review, Vol. 68, No. 4, pp. 54-57 (2013).

PATENT LITERATURE

[Patent Document 1] International Publication No. WO 2018/049343

SUMMARY OF INVENTION

Technical Problem

In the technologies described in Patent Document 1 and Non-Patent Document 2, what is obtained by the enrichment (separation) is a liquid such as HDO, and it is difficult to obtain D (HD, $D_2$, or the like) in a gas state. Further, in the technologies described in Non-Patent Document 1 and Patent Document 1, the separation efficiency of H and D is low, and there accordingly has been a demand for a technology capable of obtaining D at a lower cost.

For this reason, there has been a demand for a technology for obtaining deuterium in a gas state from a mixture gas of hydrogen (H) and deuterium at a low cost.

The present invention has been made in view of the above-described problems, and accordingly is aimed at providing an invention that solves the problems.

Solution to Problem

In order to solve the problems, the present invention is configured as follows.

A hydrogen isotope concentrating apparatus of the present invention is a hydrogen isotope concentrating/enrichment apparatus that outputs an output gas obtained from an input gas in which hydrogen ($^1H$) and a hydrogen isotope, which is an isotope of the hydrogen, are mixed, wherein the concentration ratio of the hydrogen isotope to the hydrogen in the output gas has been increased from that in the input gas, the hydrogen isotope concentrating apparatus being characterized by: that it includes a membrane electrode assembly provided with a proton conduction layer made of a proton conductor to conduct positive ions of hydrogen and having two principal surfaces opposing each other, a first electrode made of a thin film of a hydrogen permeable metal to be one of palladium (Pd), vanadium (V), tantalum (Ta) and titanium (Ti) and formed on one of the principal surfaces of the proton conduction layer, and a second electrode formed on the other one of the principal surfaces of the proton conduction layer; and that, in the membrane electrode assembly, a DC voltage is applied between the first electrode and the second electrode, the hydrogen and hydrogen isotope in the input gas being in contact with one of the first and second electrodes set to be an anode flow between the first and second electrodes, a product gas is produced at the other one of the first and second electrodes set to be a cathode, and between the product gas and an exhaust gas corresponding to the input gas after consumption of the hydrogen and hydrogen isotope therein for producing the product gas, one having an increased concentration of the hydrogen isotope is extracted as the output gas.

The hydrogen isotope concentrating apparatus of the present invention is characterized by that the second electrode includes platinum (Pt) particles, and the hydrogen permeable metal in the first electrode has a denser structure than platinum in the second electrode.

The hydrogen isotope concentrating apparatus of the present invention is characterized by that the second electrode is made of a thin film of the hydrogen permeable metal.

The hydrogen isotope concentrating apparatus of the present invention is characterized by that the thin film is an evaporated film of the hydrogen permeable metal.

The hydrogen isotope concentrating apparatus of the present invention is characterized by that a positive potential and a negative potential are applied to the first electrode and the second electrode, respectively, and the exhaust gas is taken as the output gas.

The hydrogen isotope concentrating apparatus of the present invention is characterized by that a positive potential and a negative potential are applied to the second electrode and the first electrode, respectively, and the product gas is taken as the output gas.

The hydrogen isotope concentrating apparatus of the present invention is characterized by that the first electrode and the proton conduction layer are in contact with each other across a single atomic layer graphene.

The hydrogen isotope concentrating apparatus of the present invention is characterized by that a plurality of the membrane electrode assemblies are used in a multistage manner from inputting the input gas to outputting the output gas, wherein the output gas from the membrane electrode assembly in a preceding stage is used as the input gas to the membrane electrode assembly in a following stage adjacent to the preceding one.

The hydrogen isotope concentrating apparatus of the present invention is characterized by that between the exhaust gas and the product gas of one of the membrane electrode assemblies, one that has not been taken as the output gas is used as the input gas to a membrane electrode assembly in a stage preceding that of the one of the membrane electrode assemblies.

The hydrogen isotope concentrating apparatus of the present invention is characterized by that it employs therein a membrane electrode assembly base material provided with the first electrode, the second electrode and the proton conduction layer, wherein each of the plurality of the membrane electrode assemblies is formed as a different region within a plane in a single body of the membrane electrode assembly base material.

A hydrogen isotope concentrating apparatus of the present invention is a hydrogen isotope concentrating/enrichment apparatus that outputs an output gas obtained from input gas in which hydrogen ($^1H$) and a hydrogen isotope, which is an isotope of the hydrogen, are mixed, wherein the concentration ratio of the hydrogen isotope to the hydrogen in the output gas has been increased from that in the input gas, the hydrogen isotope concentrating apparatus being characterized by: that it includes a first unit configured to be supplied with the input gas, function as a fuel cell and thereby generate a DC voltage, and includes also a second unit configured to have the DC voltage applied to it and thereby outputs the output gas; that each of the first and second units includes a membrane electrode assembly provided with a proton conduction layer made of a proton conductor to conduct positive ions of hydrogen and having two principal surfaces opposing each other, a first electrode formed on one of the principal surfaces of the proton conduction layer, and a second electrode formed on the other one of the principal surfaces of the proton conduction layer; that the first electrode in the first unit is electrically connected with the second electrode in the second unit, and the second electrode in the first unit is electrically connected with the first electrode in the second unit; that the first electrode in the second unit is made of a thin film of a hydrogen permeable metal to be one of palladium (Pd), vanadium (V), tantalum (Ta) and titanium (Ti); and that, on the first unit side, there occurs a first reaction in which, by causing the input gas to flow into a space in contact with the first electrode and introducing oxygen into a space in contact with the second electrode, the hydrogen and the hydrogen isotope in the input gas transfer to the second electrode side, thus producing water on the second electrode side and generating an electromotive force with a negative potential on the first electrode side and a positive potential on the second electrode side, and a first exhaust gas corresponding to the input gas after consumption of the hydrogen and hydrogen isotope therein by the first reaction is extracted, and, on the second unit side, there occurs a second reaction in which the first exhaust gas is made to flow into a space in contact with the first electrode, and the hydrogen and the hydrogen isotope in the first exhaust gas transfer to the second electrode side, thus producing a product gas on the second electrode side, and a second exhaust gas corresponding to the first exhaust gas after consumption of the hydrogen and hydrogen isotope therein by the second reaction is extracted and taken as the output gas.

The hydrogen isotope concentrating apparatus of the present invention is characterized by that, in the second unit, the second electrode includes platinum (Pt) particles, and the hydrogen permeable metal in the first electrode has a denser structure than platinum in the second electrode.

The hydrogen isotope concentrating apparatus of the present invention is characterized by that, in the second unit, the second electrode is made of a thin film of the hydrogen permeable metal.

The hydrogen isotope concentrating apparatus of the present invention is characterized by that the thin film is an evaporated film of the hydrogen permeable metal.

The hydrogen isotope concentrating apparatus of the present invention is characterized by that, in the second unit, the first electrode and the proton conduction layer are in contact with each other across a single atomic layer graphene.

The hydrogen isotope concentrating apparatus of the present invention is characterized by that the proton conduction layer and the first and second electrodes in the first unit are each made of the same material as that of a corresponding one of the proton conduction layer and the first and second electrodes in the second unit.

The hydrogen isotope concentrating apparatus of the present invention is characterized by that it employs a membrane electrode assembly base material including the first and second electrodes and the proton conducting layer, wherein the membrane electrode assemblies in respective ones of the first and second units are each formed as a different region within a plane in a single body of the membrane electrode assembly base material.

A hydrogen isotope concentrating apparatus of the present invention is characterized by that a plurality of enrichment/concentrating units each corresponding to the hydrogen isotope concentrating apparatus described above are used in a multistage manner, wherein the output gas from the enrichment unit in a preceding stage is used as the input gas to the enrichment unit in a following stage adjacent to the preceding one.

The hydrogen isotope concentrating apparatus of the present invention is characterized by that the product gas in one of the enrichment units is used as the input gas to the enrichment unit in a stage preceding that of the one of the enrichment units.

The hydrogen isotope concentrating apparatuses of the present invention are characterized by that the hydrogen isotope is deuterium ($^2H$ or D) or tritium ($^3H$ or T).

Advantageous Effects of Invention

By being configured as described above, the present invention enables obtaining deuterium in a gas state from mixed gas of hydrogen (H) and deuterium at a low cost.

DETAILED DESCRIPTION

Hereinafter, isotope concentrating apparatuses according to embodiments of the present invention will be described. In the isotope concentrating apparatuses, a membrane electrode assembly (MEA) is used as a basic component, similarly to the apparatus described in Patent Document 1. In an isotope concentrating apparatus according to a first embodiment, isotope separation (concentration/enrichment) is performed by applying electrical power from outside to a single MEA. In an isotope concentrating apparatus according to a second embodiment, an MEA (first unit) configured to perform both power generation and enrichment and an MEA (second unit) configured to perform only enrichment but no power generation are used in combination, wherein the same MEA as that in the first embodiment may be used as the MEA in the second unit.

First Embodiment

Figure 1:
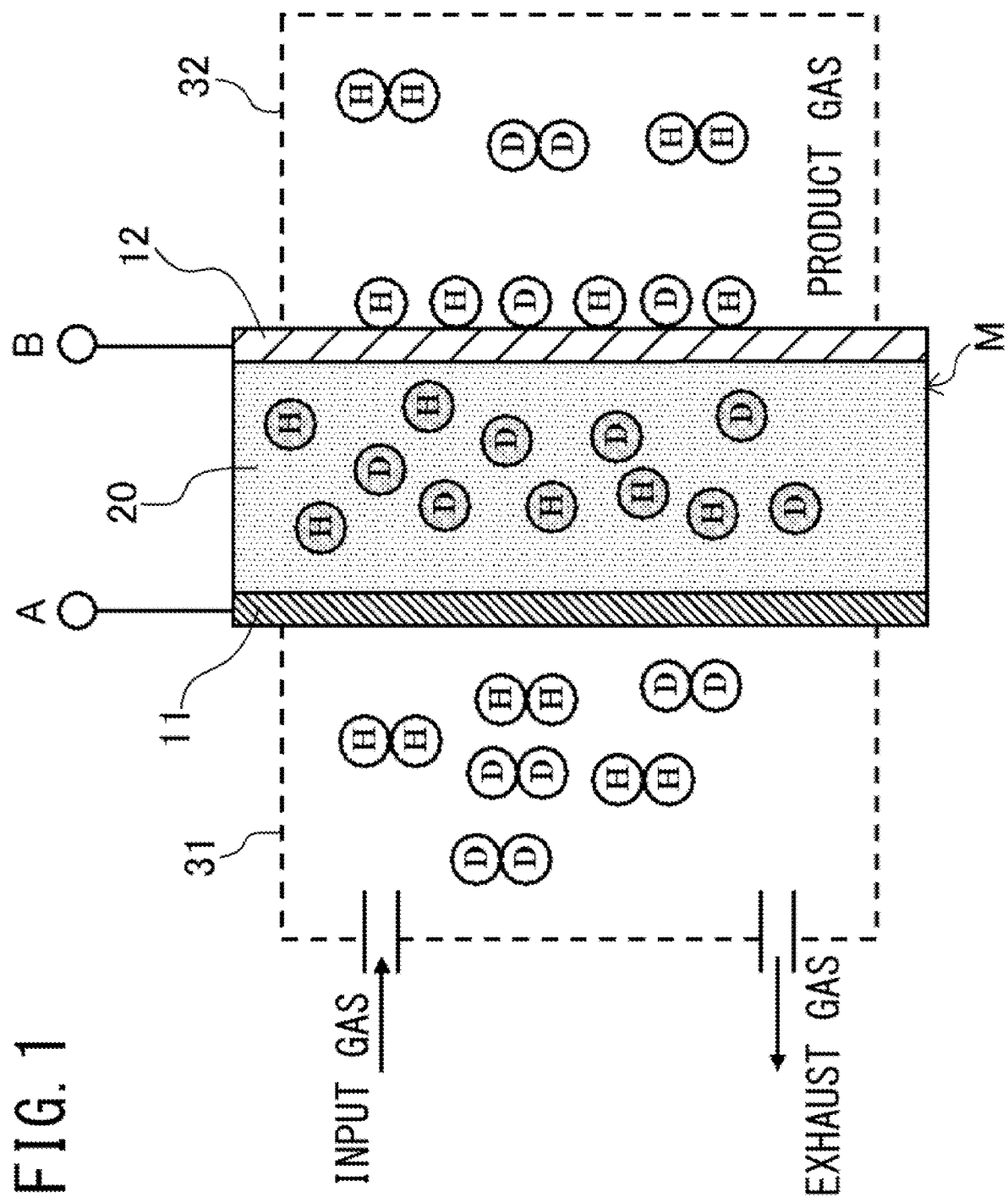
FIG. 1 is a diagram showing a configuration of a membrane electrode assembly and its surroundings used in a hydrogen isotope concentrating apparatus according to a first embodiment of the present invention.

FIG. 1 is a diagram showing a configuration of an MEA denoted as M and its surroundings used in an isotope separating apparatus according to the first embodiment. In the configuration, two electrodes (a first electrode 11 and a second electrode 12) between which a DC voltage is applied and a proton conduction layer 20 sandwiched between them are used. Here, when a DC voltage is applied between the first electrode 11 (terminal A) and the second electrode 12 (terminal B), there are both a case of setting the first electrode 11 to be positive and a case of setting the second electrode 12 to be positive, and the following descriptions will be given assuming the case of setting the first electrode to be positive, first. An atmosphere on the side of the first electrode 11 (left side of the first electrode 11 in FIG. 1) and an atmosphere on the side of the second electrode 12 (right side of the second electrode 12 in FIG. 1) are each assumed to be a gas.

In FIG. 1, into a space where a surface of the first electrode 11 set to be an anode is located (a space on the left side in the drawing: anode side gas chamber 31), a gas containing hydrogen H and deuterium D (mixed gas of $H_2$ and $D_2$) is input at the upper side in the drawing, and the gas is used as an input gas. $H_2$ and $D_2$ in the input gas are dissociated on the surface of the first electrode 11 (anode), and the H component and D component are consumed by reacting as described below. On the other hand, the H component (H ions) and D component (D ions) transfer through the proton conduction layer 20 to the right side in the drawing and are bonded on a surface of the second electrode 12 (cathode) to produce $H_2$ and $D_2$ again in a space where the surface of the second electrode 12 is located (a space on the right side in the drawing: cathode side gas chamber 32). A gas thereby produced on the cathode side is taken as a product gas.

The first electrode 11 is an electrode made of a metal allowing hydrogen (H component and D component) to permeate the metal (hydrogen permeable metal), which is, for example, Pd, as will be described later. Positive H ions and positive D ions having permeated the first electrode 11 flow to the side of the second electrode 12 in the proton conduction layer 20. Part of $H_2$ and $D_2$ in the input gas is consumed by thus flowing from the anode to the cathode side, and remaining part of the input gas is taken as an exhaust gas. When the first electrode 11 contains Pd as in the present case, $H^+$ and $D^+$ are generated by catalytic reactions caused by Pd, which are expressed by following equations (1) and (2), and they flow in the proton conduction layer 20 toward the right side in the drawing.

[Equation 1]

$$PdH \rightarrow Pd + e^- + H^+ \quad (1)$$

$$PdD \rightarrow Pd + e^- + D^+ \quad (2)$$

As a material constituting the proton conduction layer 20, a conductor of H ions and D ions (proton conductor) such as Nafion (registered trademark) described in Patent Document 1, for example, may be used. By these ions flowing in the proton conduction layer 20 from the left side to the right side in the drawing and causing reoxidation reactions at the second electrode 12, $H_2$, $D_2$ and the like similar to those in the input gas are produced to form a product gas on the side of the second electrode 12.

When the first electrode 11 is used as an anode and the second electrode 12 is used as a cathode in FIG. 1, H ions and D ions flow in the proton conduction layer 20 from the left side to the right side in the drawing. In that case, when hydrogen (H) component in the input gas more easily flows into an atmosphere on the cathode side (the right side in the drawing) than deuterium (D) component in the input gas, the H/D composition ratio in the product gas becomes higher than that in the input gas. Accordingly, $H_2$ is consumed in a larger amount than $D_2$ in the input gas, and D component is consequently enriched in the exhaust gas that is extracted after the H and D components in the input gas are thus consumed, and as a result, the exhaust gas may be taken as an output gas having an increased D component concentration.

By contrast, when the flowing into an atmosphere on the cathode side (the right side in the drawing) is easier for D component in the input gas than for H component in the input gas, the D/H composition ratio in the product gas becomes higher than that in the input gas. Accordingly, the product gas may be taken as an output gas having an increased D component concentration.

In the fuel cell described in Patent Document 1, the same material (such as platinum (Pt)) is used for both the anode and the cathode, and in particular, a Pt/C catalyst in which Pt having a catalytic effect in a fine particle form is combined with carbon particles is often used as the electrode material. In that case, thus using Pt in a fine particle form, its surface area is increased and its catalytic effect accordingly is enhanced, and hydrogen can easily permeate through the Pt electrode. By contrast, as the first electrode 11 in the MEA M in the present embodiment, a thin film of a hydrogen permeable metal selected from palladium (Pd), vanadium (V), tantalum (Ta) and titanium (Ti) is used. Here, the thin film has a denser structure than that of Pt in the Pt/C catalyst described above, and is, for example, a thin film formed by vacuum evaporation. While the hydrogen permeable metal used here has such a dense structure, hydrogen can sufficiently permeate the thin film.

Experimental results performed in this respect will be described below. In the experiment, Nafion with a film thickness of 52 μm was used as the proton conduction layer 20, and the first electrode 11 was set to be the anode and the second electrode 12 was set to be the cathode. Using Pt/C for the second electrode 12, various materials were used for the first electrode 11. Here, the Pt/C refers to an electrode consisting of a Pt/C catalyst supported on a carbon sheet, which is similar to that used in a fuel cell. The Pt/C catalyst refers to that in which a lot of Pt fine particles with a few nm average particle size are supported on carbon fine particles with an average particle size of about 10 to 50 nm. The Pt/C electrode is generally used as an electrode in a fuel cell, where the carbon sheet mainly functions as an electrode, and the Pt fine particles mainly function as catalysts.

The present experiment was performed on three kinds of cases respectively using, as a material for the first electrode 11, the same Pt/C as that used for the second electrode 12 (a comparative example 1-1), Pd/C obtained by replacing Pt fine particles in the Pt/C with Pd fine particles (a comparative example 1-2), and a Pd thin film formed by evaporation (an example 1-1). The comparative example 1-1 is a case using the same material for both the first electrode 11 and the second electrode 12, and corresponds to a similar structure to the fuel cell described in such as Patent Document 1. Pd was used in both the example 1-1 and the comparative example 1-2, but in different forms. The thickness of the Pd thin film (in the example 1) was set at 6 nm. Pd in the Pd thin film used in the example 1-1 had a denser structure than that of Pd in the Pd/C used in the comparative example 1-2 and that of Pt in the Pt/C used in the comparative example 1-1. That is, Pd used in the example 1-1 and that used in the comparative example 1-2 are significantly different in density.

Figure 2:
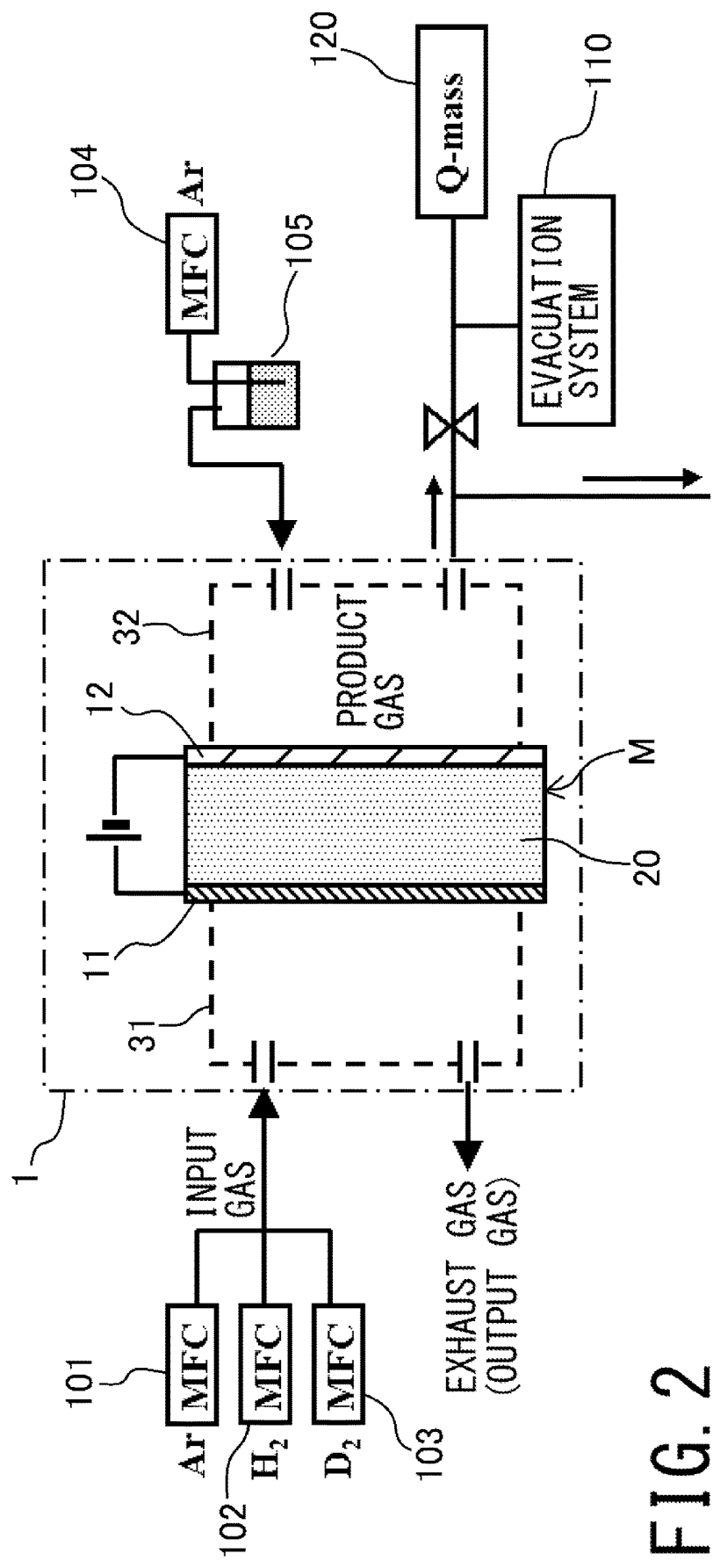
FIG. 2 is a diagram showing a configuration used when measurement was performed on an example of the present invention in which a first electrode was set to be an anode and a second electrode was set to be a cathode.

A D enrichment rate was measured for each of the three cases using different materials as described above. FIG. 2 schematically shows an apparatus configuration used for the measurement. In the drawing, a portion surrounded by a dashed dotted line corresponds to a hydrogen isotope concentrating apparatus 1 used here. As an actual input gas on the side of the first electrode 11, a mixed gas of Ar, $H_2$ and $D_2$ with their flow rates respectively controlled by mass flow controllers (MFCs) 101, 102 and 103 was used. Here, Ar was used as a carrier gas. On also the side of the second electrode 12 (product gas side), Ar with its flow rate adjusted by a mass flow controller 104 was made to flow after being bubbled through $H_2O$ in a bubbler 105, because a water ($H_2O$) component is required for conduction in the proton conduction layer 20 (Nafion). In FIG. 2, an atmosphere on the side of the first electrode 11 and that on the side of the second electrode 12 were both set at atmospheric pressure, and the proton conduction layer 20 and the like were set at room temperature. Composition analysis of H and D in the product gas on the side of the second electrode 12 was performed by a Q-mass (quadrupole mass spectrometer) 120 after extracting the product gas by an evacuation system 110 (a combination of a turbomolecular pump and a dry pump). Proportions of H and D in the input gases were set by the MFCs 102, 103.

In the present experiment, in the example 1-1, an increased H/D composition ratio was obtained in the product gas as will be described later, and accordingly the exhaust gas in FIGS. 1 and 2 was able to be taken as an output gas, as described earlier. Here, comparing a D/H composition ratio (molar ratio) in the input gas injected initially, $D/H_{in}$, and that in the exhaust gas extracted after consumption of H and D as described above, $D/H_{out}$, $(D/H_{in})/(D/H_{out})$ may be taken as a D enrichment rate. When the D enrichment rate is 1, it is indicated that there is no selectivity between H and D in the configuration of FIG. 1, and when the D enrichment rate exceeds 1, it is indicated that there is an effect of selectively removing H in the input gas, such as that described earlier. Here, actual measurement of the composition ratios of H and D was performed on the input gas (composition ratio $D/H_{in}$) and on the product gas produced on the cathode side. The above-described composition ratio in the exhaust gas, $D/H_{out}$, can be calculated assuming that a composition of the product gas is created as a result of the above-described reactions caused by part of H and D components in the input gas whose amount is determined by multiplication by a reaction efficiency. In the present experiment, the D enrichment rate was calculated assuming the reaction efficiency to be 50%.

Figure 3A:
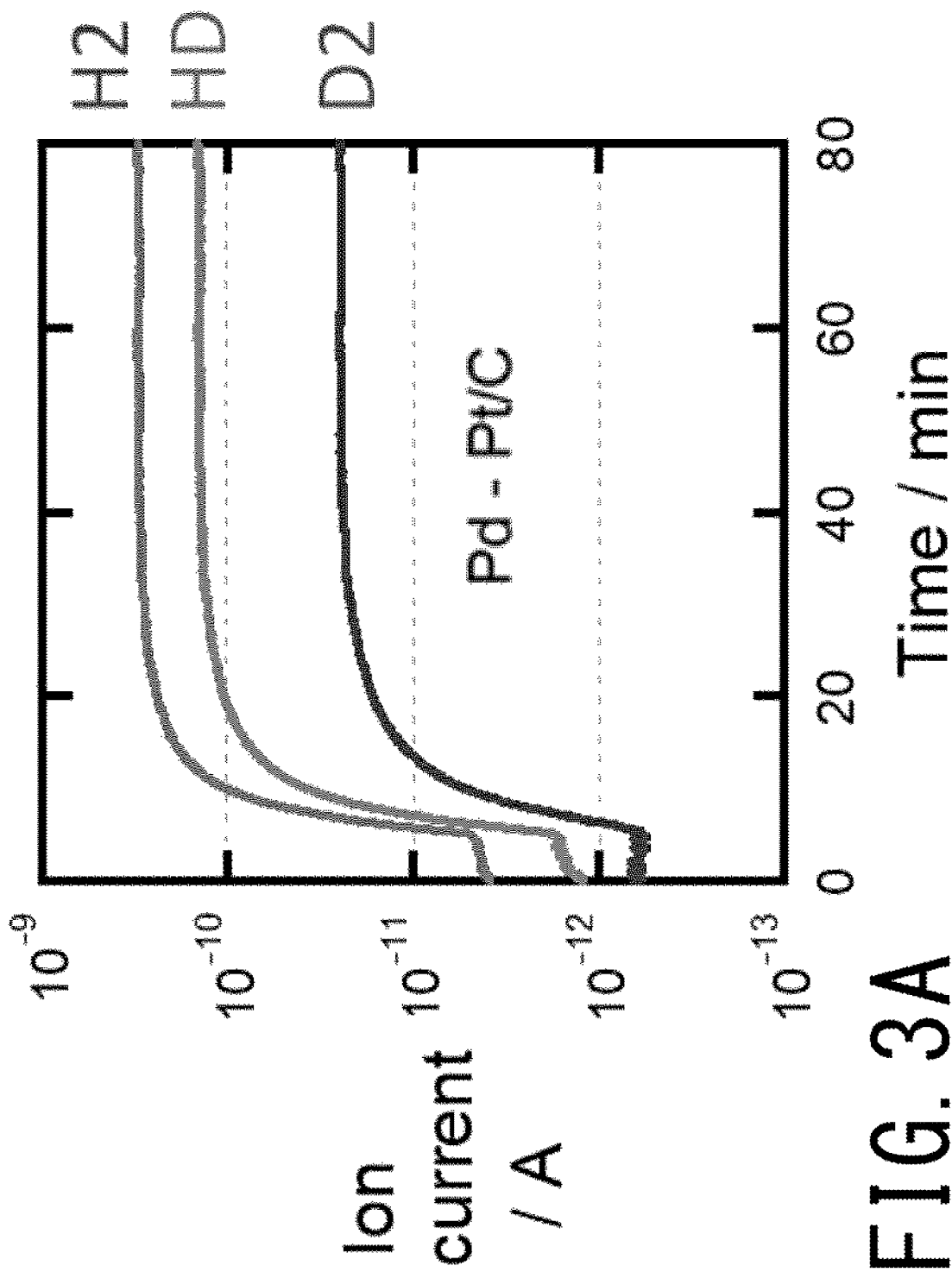
FIGS. 3A-3B show a result of measuring temporal change of ion currents respectively corresponding to H, D and HD in a product gas. An example is shown in FIG. 3A and a comparative example is shown in FIG. 3B.
Figure 3B:
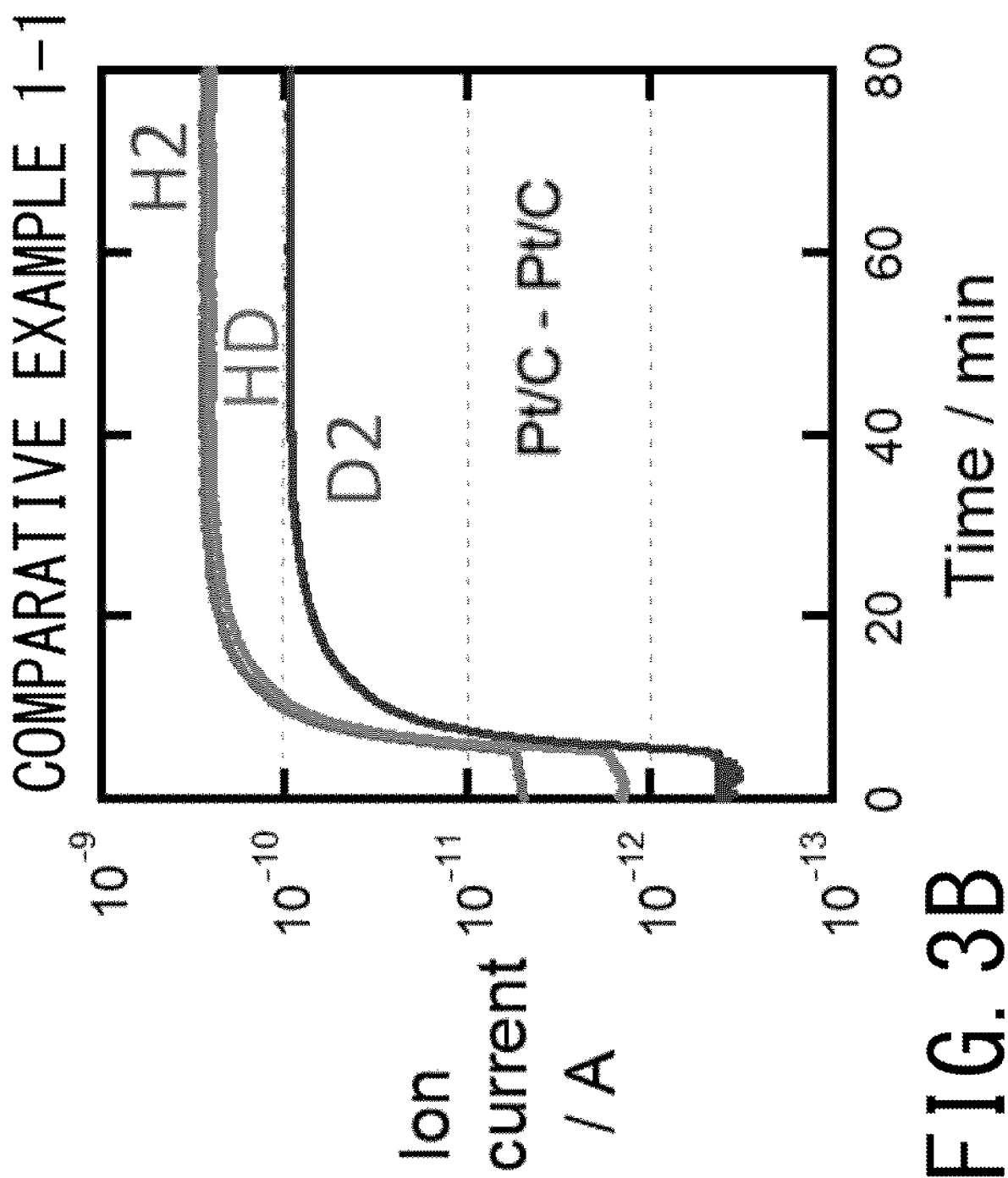

FIG. 3 shows results of measuring temporal changes of ion currents respectively corresponding to $H_2$, HD and $D_2$ components that were identified by separating them according to their masses in the Q-mass 120, on the example 1-1 (a) and the comparative example 1-1 (b), where a voltage causing a current amount flowing between the first electrode 11 and the second electrode 12 to be 0.025 A was applied in each case (in the present cases, the voltage was about 0.01 to 0.1 V). In both cases, it is clearly seen that, by the above-described reactions progressing and H ions and D ions thus flowing to the cathode side, $H_2$ and $D_2$ are gradually produced on the cathode side, HD is also produced, and each of the amounts of the components becomes constant (saturates) after elapse of about 45 minutes.

Figure 4:
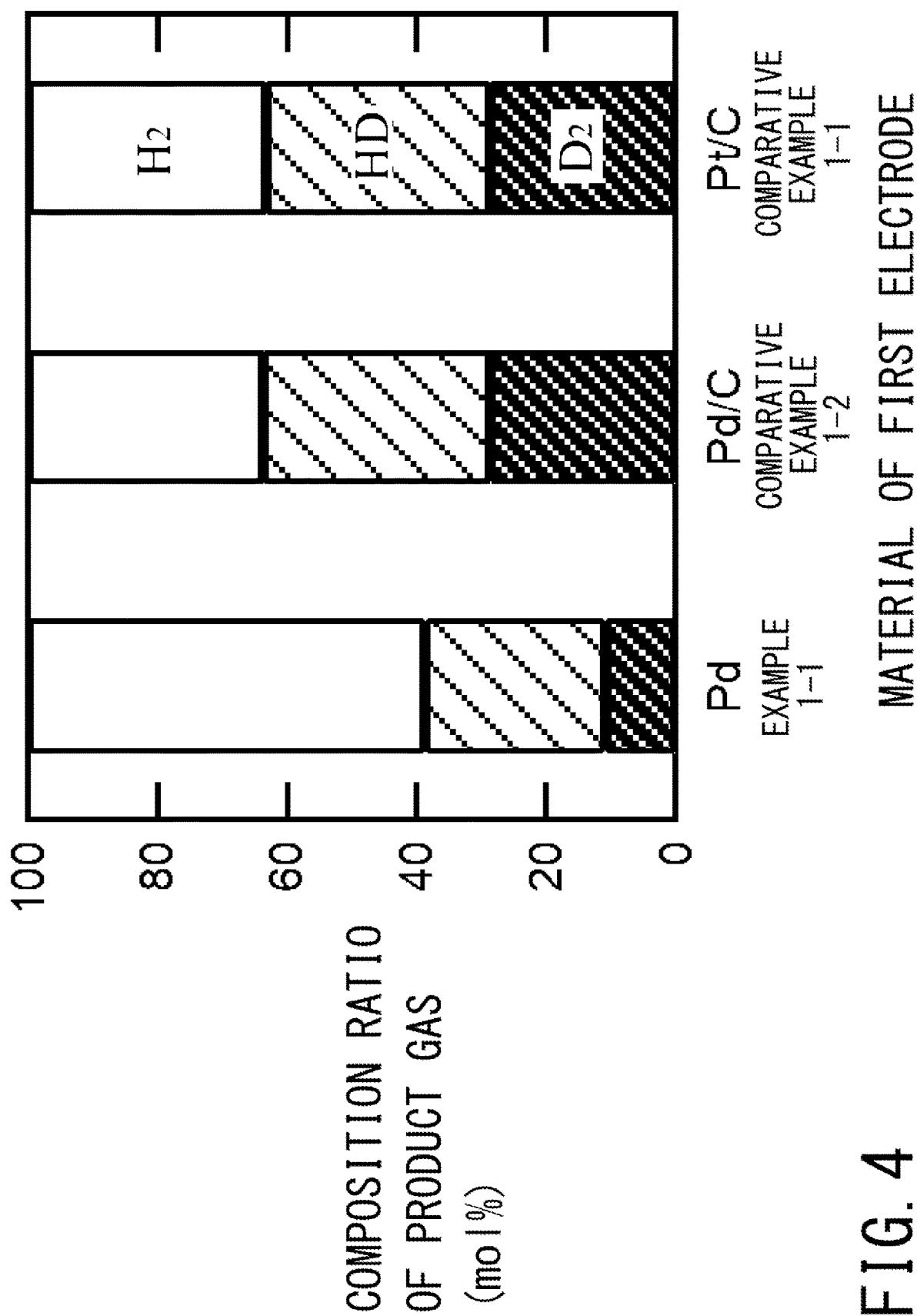
FIG. 4 shows a result of measuring a composition ratio of a product gas in an example and comparative examples.
Figure 5:
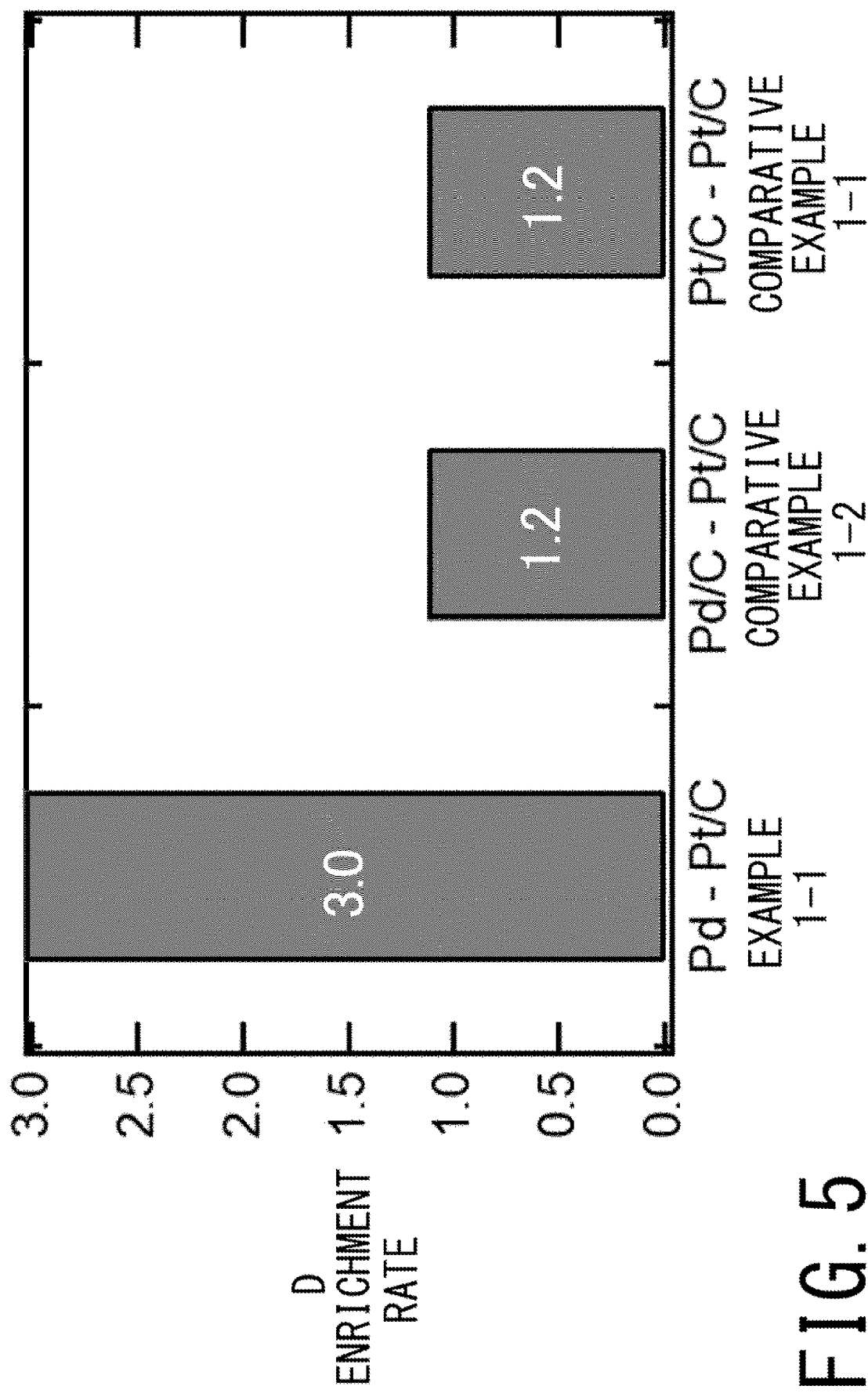
FIG. 5 shows a result of calculating a D enrichment/concentrating rate of an exhaust gas in an example and comparative examples.

A composition ratio determined by taking the saturation value for each component in the product gas as the amount of the component is shown in FIG. 4, for each of the above-described three kinds of materials used for the first electrode 11 (anode). In FIG. 5, for the same cases, the above-described D enrichment ratio in the output gas (exhaust gas) obtained by assuming the reaction efficiency on the anode side to be 50% as already described is shown, for each of the materials. From these results, it is indicated that, particularly in the example 1-1 using the Pd thin film for the anode, it is possible to cause production of H component in the product gas selectively in a large amount, accordingly cause consumption of H component in the input gas in a larger amount, as shown in FIG. 4, and thereby increase the proportion of D component (make the D enrichment ratio larger than 1) in the output gas (exhaust gas), as shown in FIG. 5.

In FIG. 5, in the cases of respectively using Pd/C (comparative example 1-2) and Pt/C (comparative example 1-1) for the anode, the D enrichment rate is close to 1.0, which indicates that no significant selectivity between H and D is recognized in the cases. In contrast, only in the case of using the Pd thin film (example 1), the D enrichment rate is 3.0, indicating that the D concentration in the exhaust gas can be thus increased.

Figure 6:
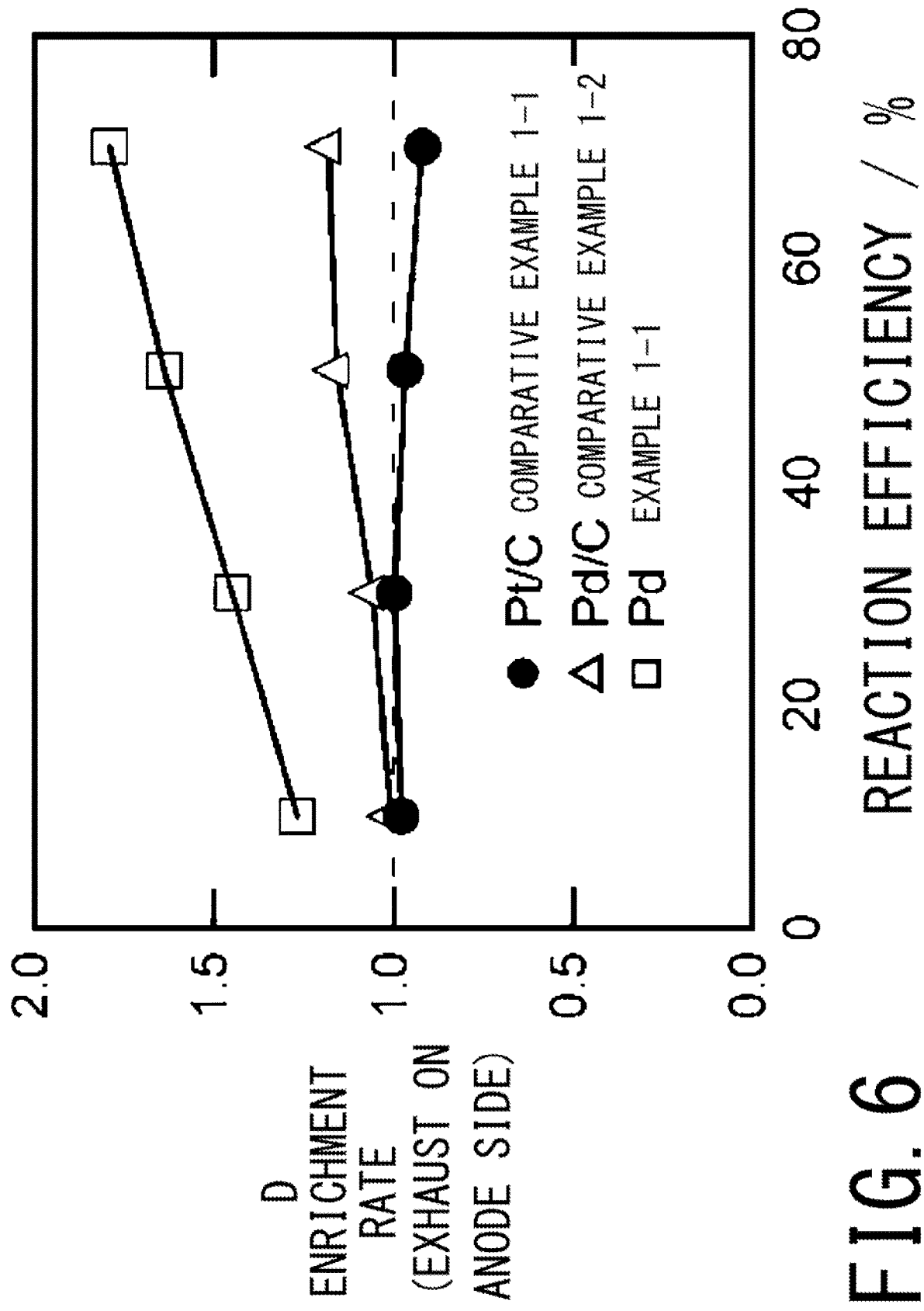
FIG. 6 shows a result of measuring a D enrichment rate in an example and comparative examples, varying an applied voltage.

FIG. 6 shows results of measuring the D enrichment rate in the example 1-1, comparative example 1-1, and comparative example 1-2 by varying the applied voltages. Here, as there is one to one relationship between the current flowing between the electrodes and the reaction efficiency, the horizontal axis is set to represent the reaction efficiency converted from the current depending on the applied voltage. The results indicate that, regardless of the voltage between the first electrode 11 and the second electrode 12, the D component cannot be enriched in the comparative example 1-1 using Pt/C, but can be enriched in the example 1-1 and the comparative example 1-2 both using Pd. Here, the effect is particularly remarkable in the example 1-1 using the Pd thin film, and is small in the comparative example 1-2 using Pd/C. Absolute values of the D enrichment rate in FIG. 6 are slightly different from that in FIG. 5, owing to a difference in aspect of the measurement.

As the surface area of Pd is larger in the comparative example 1-2 than in the example 1-1, the efficiency of the reaction of dissociating hydrogen molecules and the like ($H_2$ and $D_2$) (oxidation reaction) on the anode 11 is higher in the comparative example 1-2. Therefore, the above-described results indicate that what contributes to the increase in D enrichment rate is not the oxidation reaction, but is another reaction, for example, subsequent absorption or diffusion of H ions and D ions to the anode. Further, in the example 1-1, the Pd thin film is used with its thickness being set at a smaller thickness, such as 6 nm as described earlier, than that in a case of using Pd as an independent hydrogen permeable layer as described in Non-Patent Document 1, and it accordingly becomes possible to reduce the cost of the anode. Even in the present case of using such a thin Pd film, a main body in the structure of FIG. 1 is still the thick proton conduction layer 20, and therefore, it is unlikely that a problem is raised by embrittlement of Pd caused by hydrogen. It is further obvious that the use of a thin Pd film enables obtaining the above-described configuration at a low cost.

Figure 7:
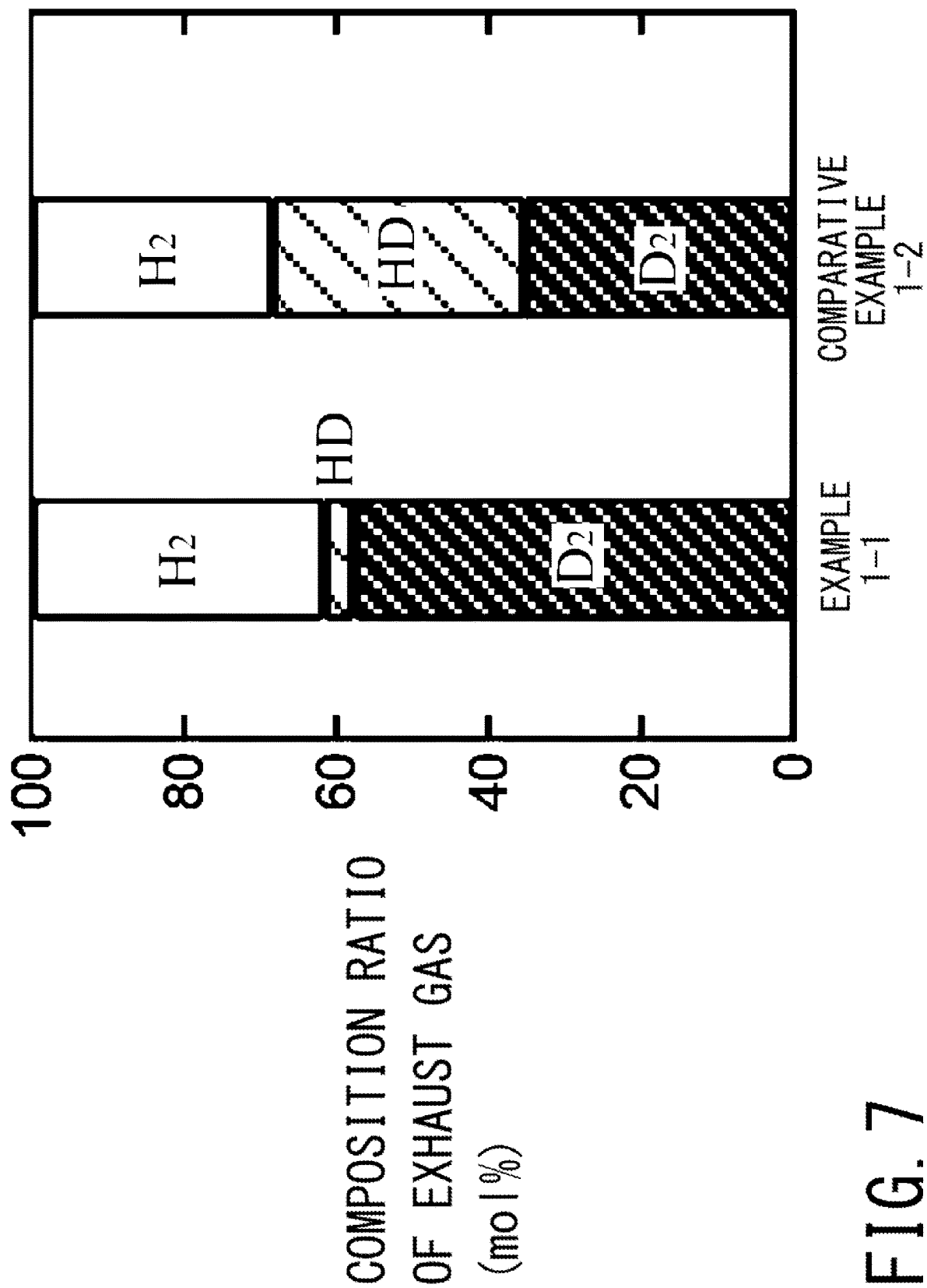
FIG. 7 shows a result of measuring a composition of an exhaust gas in an example and a comparative example.

A result of detail composition analysis of the output gas (exhaust gas in FIGS. 1 and 2) performed on the examples 1-1 (case of using Pd as the anode) was compared with, particularly, a result of the analysis performed on the comparative example 1-2 using also Pd. There, compositions in terms of $H_2$, $D_2$ and HD in the output gases obtained when using the same input gas were measured. FIG. 7 shows the measurement results on the example 1-1 and the comparative example 1-2. In the results, in contrast to that the presence of HD in the output gas is remarkable in the comparative example 1-2, the proportion of HD component is extremely small in the example 1-1.

In the configuration of FIG. 2, no HD is present in the input gas inherently, and such HD as detected here is produced as a result of combination of H and D both having been dissociated by the catalytic effect of Pd. It accordingly is considered that a large amount of HD was produced particularly in the comparative example 1-2 in which Pd/C having a large Pd surface area and a large catalytic effect action was used for the anode, similarly to the case of the product gas shown in FIG. 4. What is specifically required as deuterium in a gas state is not HD consisting of D and H in combination, but is $D_2$ consisting of only D and no H, and therefore, from also this viewpoint, the example 1 using the Pd thin film (evaporated film) is preferred as a deuterium concentrating apparatus.

Figure 8:
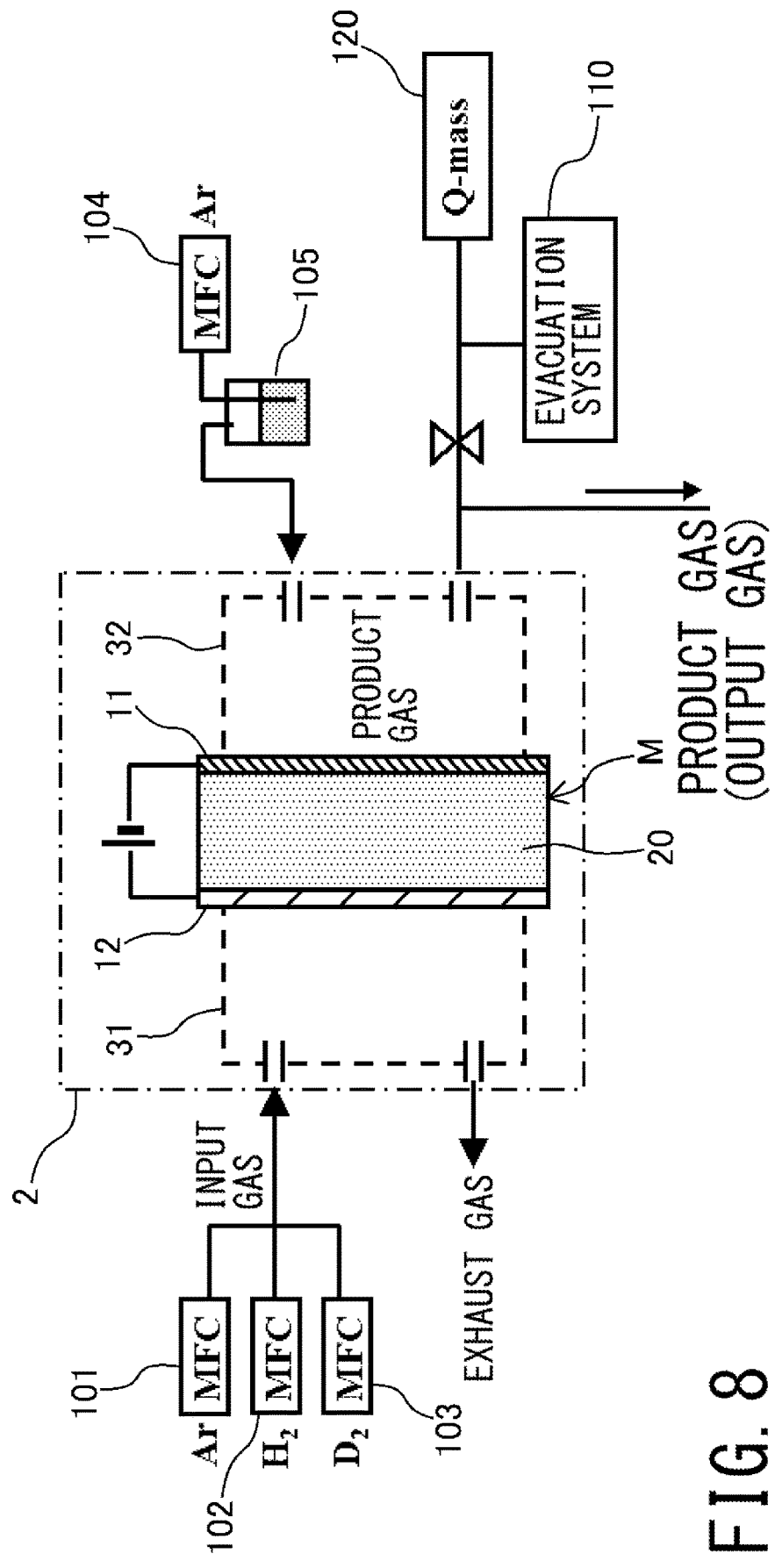
FIG. 8 is a diagram showing a configuration used when measurement was performed on an example of the present invention in which a first electrode was set to be a cathode and a second electrode was set to be an anode.

Next, descriptions will be given of a result on a case of using the first electrode 11 as the cathode and the second electrode 12 as the anode, inversely to the examples described above, and further a result on a case of using other materials than Pd as a material for the first electrode 11. FIG. 8 schematically shows an apparatus configuration used for the present measurement in a manner of keeping correspondence to FIG. 2. In the drawing, a portion surrounded by a dashed dotted line corresponds to a hydrogen isotope concentrating apparatus 2 used here. In the present case, the input gas is input into a space containing the second electrode 12, in contrast to that the input gas was input into the space containing the first electrode 11 in the configuration of FIG. 2. Accordingly, in the configuration of FIG. 8, positions of the first electrode 11 and the second electrode 12 are interchanged compared with that in the case of FIG. 2, but positions and functions of the anode side gas chamber 31 and the cathode side gas chamber 32 each remain unchanged. In the present case, the D/H ratio in the product gas increased from that in the input gas, in examples (described below), and accordingly the product gas is taken as the output gas as described earlier. In that case, a composition of the output gas (product gas) is measured by the Q-mass 120 in the configuration of FIG. 8.

Figure 9:
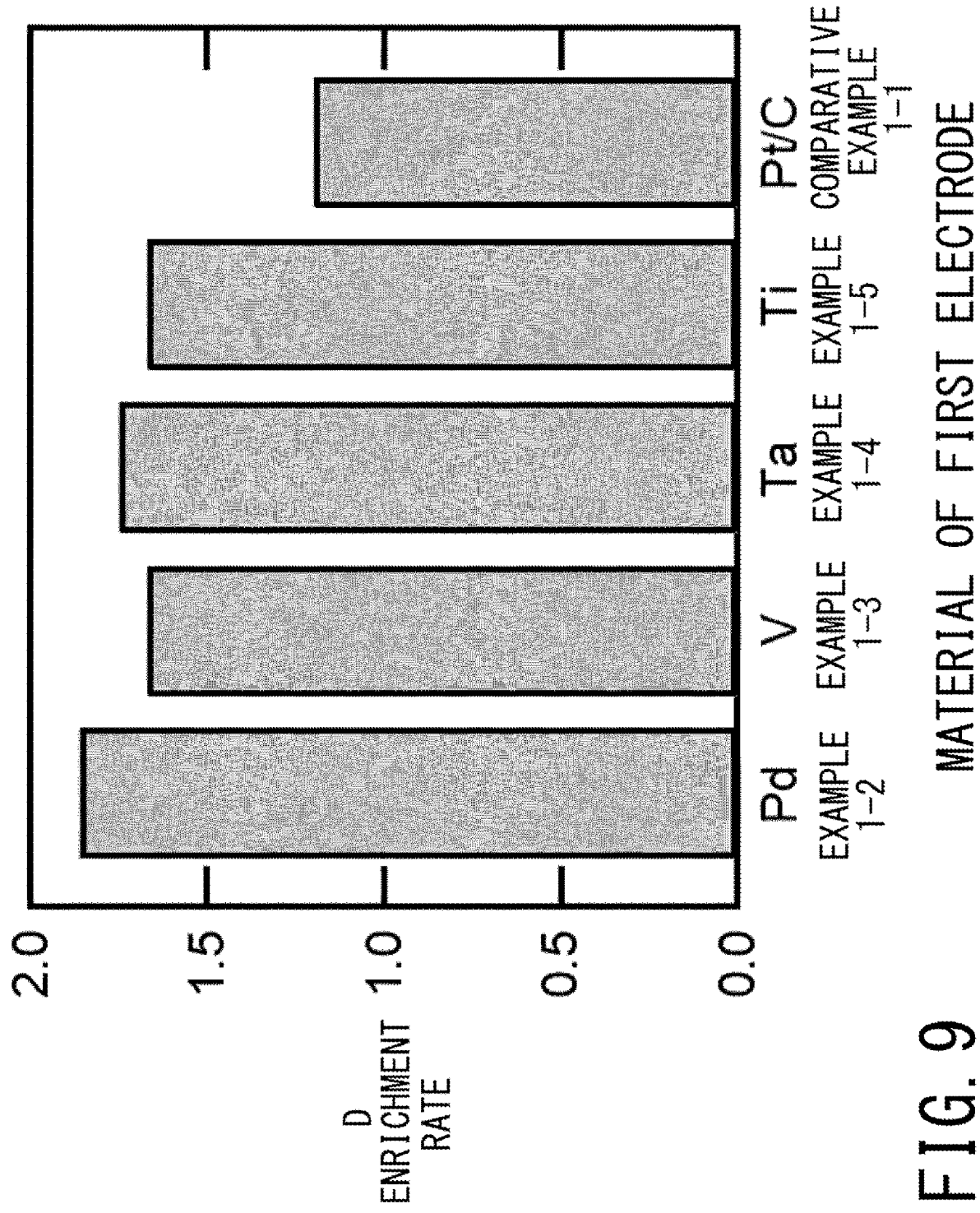
FIG. 9 shows a result of calculating a D enrichment rate of a product gas in a plurality of examples.

In the present experiment, the first electrode 11 was used as a cathode (on the right side in the drawing) and the second electrode 12 as an anode (on the left side in the drawing), the same Pt/C as that described earlier was used for the second electrode 12, and a case of using Pd for the first electrode 11 and cases of respectively using vanadium (V), tantalum (Ta) and titanium (Ti), which are metals allowing hydrogen to permeate them similarly to Pd, for the cathode 11 are referred to as examples 1-2 to 1-5, respectively, where the D enrichment rate was measured by the same method as that already described. In also these cases, the configurations were made such that the input gas becomes in contact with a surface on the side of the anode (second electrode 12), and H ions and D ions flow from the anode side toward the side of the cathode (first electrode 11) in the proton conduction layer 20. Results of the measurement of the D enrichment rate in these cases are shown in FIG. 9. There, the already-described result on the comparative example 1-1 using Pt/C for both the anode and the cathode is also shown. As the first electrode 11 in each of the examples 1-2 to 1-5, a 50 μm thick metal foil of Pd, V, Ta, or Ti was used, for the convenience of handling the MEA. Even when the thickness of the evaporated film used as the first electrode in the example 1-1 was increased to 20 nm, there was obtained a result with no significant difference from that already described on the example 1-1, and therefore, it is considered that there is no essential difference between the metal foils and the evaporated films, and that a thickness difference within at least such a range causes no difference in the results.

As seen in the results, a D enrichment rate sufficiently larger than 1 was obtained in each of the examples 1-2 to 1-5. That is, by using these metals having a dense structure for the cathode (the first electrode 11), it is possible to obtain an output gas (product gas) having a D concentration increased from that in the input gas. There, V, Ta and Ti can be used, besides Pd, in the same way as Pd. These hydrogen permeable metals are metals allowing H and D ions to permeate them, as described above, and it is preferable to use such hydrogen permeable metals in a form of a dense structure as the first electrode 11. When materials used for the anode and the cathode in the comparative example 1-2 (Pd/C for the anode, and Pt/C for the cathode) were interchanged (to have Pt/C for the anode, and Pd/C for the cathode: the comparative example 1-3), as in the example 1-2, the D enrichment ratio was measured to be 1.

Further, when the first electrode 11 and the second electrode 12 were both made of the Pd thin film (an example 1-6), the D enrichment rate was measured to be as high as about 2.9. From the above results, it is estimated that such D enrichment effect as described above is caused by particularly the characteristics of the first electrode 11 or of the interface between the first electrode 11 and the proton conduction layer 20, and is basically independent of the electrode polarity and the second electrode 12. In both cases of the electrode polarity, the input gas is input to be in contact with the anode side, and the output gas with an increased D concentration is extracted from the side of the first electrode 11 (anode side in FIG. 2, and cathode side in FIG. 8). Here, while the Pd thin film was used in the examples 1-1, 1-2, and 1-6, it can be estimated, from the results on the examples 1-3 to 1-5, that the same result is obtained when a thin film of V, Ta or Ti is used.

Next, a description will be given of a result in a case where a thin layer made of a material other than hydrogen permeable metals is added in the first electrode 11. In the present case, a material used for the added layer was graphene that allows hydrogen to permeate it similarly to Pd, like that described in S. Hu, M. Lozada-Hidalgo, F. C. Wang, A. Mishchenko, F. Schedin, R. R. Nair, E. W. Hill, D. W. Boukhvalov, M. I. Katsnelson, R. A. W. Dryfe, I. V. Grigorieva, H. A. Wu and A. K. Geim, "Proton Transport Through One-Atom-Thick Crystals", Nature, Vol. 516, pp. 227-230 (2014). H ions and D ions permeate through a hexagonal crystal structure of graphene.

In an example thus configured (example 1-7), a single-atomic layer of graphene was formed on a surface of the proton conduction layer 20 before forming by evaporation the 6 nm thick Pd as the cathode as in the already-described example 1-1 (hereafter, the electrode material used in the present case will be referred to as Pd/Gr). For the cathode, Pt/C was used to form the second electrode 12 similarly to in such as the example 1-1. In the present case, the D enrichment rate was 6.7, which is higher than that obtained in the example 1-1. Further, when the current was particularly reduced, the D enrichment rate was further increased to be 26 at maximum, while the processing speed decreased. Thus, the D enrichment rate is further increased by inserting a single atomic layer graphene between Pd (the first electrode 11) and the proton conduction layer 20.

It is considered the above result is caused by that the difference between H and D ions in zero-point vibration energy on the side of the proton conduction layer 20 is larger when graphene is present than when graphene is absent, and by influence of a quantum tunneling effect. That is, the D enrichment rate can be particularly increased by thus inserting such a substance capable of increasing the difference between H ions and D ions in zero-point vibration energy and of allowing hydrogen (H ions and D ions) to permeate it, between the hydrogen permeable metal and the proton conduction layer 20. In addition, a D enrichment rate larger than 1 was obtained also when the electrode polarity in the example 1-7 was reversed (when the first electrode 11 and the graphene were set to be the cathode side: an example 1-8). However, the D enrichment rate obtained in the example 1-8 was about 2.5, which is smaller than in the example 1-7. That is, the configuration using graphene in combination with the first electrode 11 is particularly effective when the combination is set to be the anode side.

Values of the D enrichment rate measured on the above-described examples and comparative examples are shown in Table 1. The results indicate that a particularly high D enrichment rate can be obtained when a thin film of the above-described hydrogen permeable metals is used for the electrodes.

TABLE 1

|  | Anode | Cathode |  |
| --- | --- | --- | --- |
|  | First Electrode | Second Electrode | D Enrichment Rate |
| Example 1-1 | Pd Evaporated Film (Pd Foil) | Pt/C | 3.0 |
| Comparative Example 1-1 | Pt/C | Pt/C | 1.2 |
| Comparative Example 1-2 | Pd/C | Pt/C | 1.2 |
| Example 1-6 | Pd Evaporated Film | Pd Foil | 2.9 |
| Example 1-7 | Pd Evaporated Film/Gr | Pt/C | 6.7 |

TABLE 1-continued

|  | Anode | Cathode |  |
| --- | --- | --- | --- |
|  | Second Electrode | First Electrode | D Enrichment Rate |
| Example 1-2 | Pt/C | Pd Foil | 1.8 |
| Example 1-3 | Pt/C | V Foil | 1.7 |
| Example 1-4 | Pt/C | Ta Foil | 1.8 |
| Example 1-5 | Pt/C | Ti Foil | 1.7 |
| Example 1-8 | Pt/C | Pd Evaporated Film/Gr | 2.1 |
| Comparative Example 1-3 | Pt/C | Pd/C | 1.2 |

Figure 10:
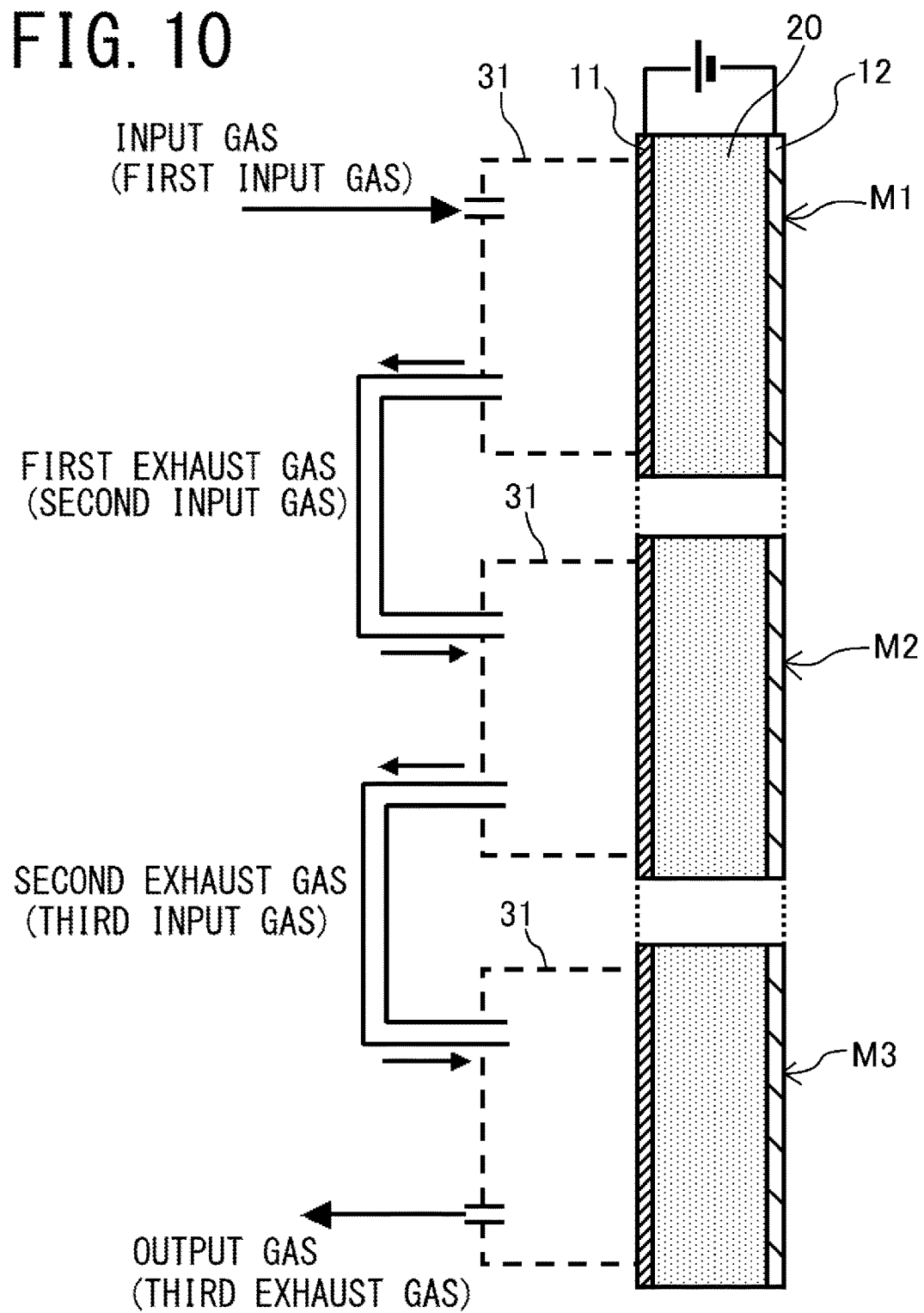
FIG. 10 is a diagram showing a configuration of a first modification of the hydrogen isotope concentrating apparatus according to the first embodiment.

Next, descriptions will be given of a configuration in which a plurality of MEAs, M, described earlier are used, and D component enrichment is thereby performed in a multistage manner, to increase efficiency of the enrichment. FIG. 10 shows a configuration of a hydrogen isotope concentrating apparatus 3 (a first modification) in such a case, which is provided with three stages each having a configuration that uses the first electrode 11 as the anode and the second electrode 12 as the cathode as in FIG. 2, or in the example 1-1. There, MEAs denoted by M1, M2 and M3 are used sequentially in this order from the upstream side (upper side in the drawing), an input gas before enrichment is input as an input gas (first input gas) to M1 of the first stage, and an output gas whose D concentration is finally to be highest corresponds to an exhaust gas (third exhaust gas) of M3 of the final stage (third stage). In the present case, in each of M1, M2 and M3, an exhaust gas on the side of the first electrode 11 (anode) is to be a gas with an increased D concentration, as described earlier. In FIG. 10, the drawing is made such that a voltage is applied only to M1 for convenience, but correctly, the voltage is applied to each of M1, M2, and M3 in parallel. Additionally, In FIG. 10, a configuration of the side of the second electrode 12 is omitted in the drawing, because it is specific to each of M1, M2, and M3 and is not related with the effect.

In the present case, the anode side gas chambers 31 of MEAs adjacent to each other are connected to each other so that an output gas of M1 (first exhaust gas) directly becomes an input gas to M2 in the next stage (second input gas) and an output gas of M2 (second exhaust gas) directly becomes an input gas to M3 in the next stage (third input gas). With this configuration, it is possible to increase the D concentration of the input gas of M1 (first input gas) consecutively by M1, M2, and M3, and consequently output as the exhaust gas of M3 (third exhaust gas).

Figure 11:
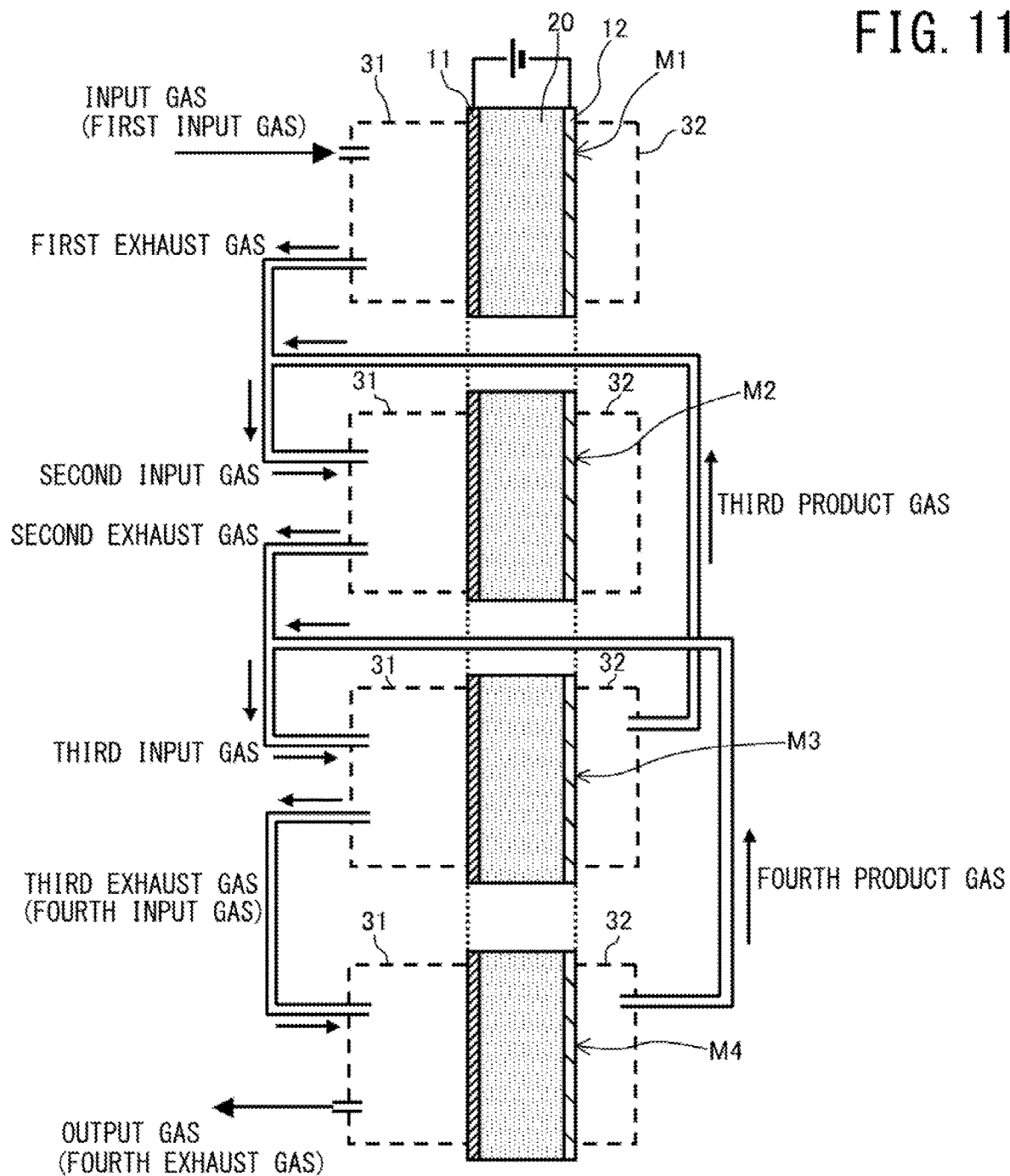
FIG. 11 is a diagram showing a configuration of a second modification of the hydrogen isotope concentrating apparatus according to the first embodiment.

FIG. 11 shows a configuration of a hydrogen isotope concentrating apparatus 4 (second modification) corresponding to a modification of the configuration of FIG. 10. There, MEAs denoted by M1 to M4 are used in this order from the top, and similarly to in the description just given above, the anode gas chambers 31 of the MEAs M1 to M4, are connected such that the exhaust gas of a preceding stage becomes the input gas of the next stage. However, the present case is different in that also the product gas in FIG. 1 is used by feeding it back.

In FIG. 11, the D concentration of the exhaust gas from a stage and that of the input gas to a stage become higher in a stage located lower. Accordingly, also the D concentration of the exhaust gas inevitably becomes higher in a stage located lower. In that case, while the D concentration of the product gas is lower than that of the input gas and of the exhaust gas in each MEA, as described earlier, it may occur that the D concentration of the product gas in a following stage becomes higher than that of the exhaust gas in a stage preceding the following one. In the configuration of FIG. 11, when the D concentration of the product gas of M3 (third product gas) is higher than that of the exhaust gas of M1 (first exhaust gas), by extracting the product gas (third product gas) from the cathode side gas chamber 32 in M3, combining it with the exhaust gas of M1 (first exhaust gas), and using the combination as the input gas to M2 (second input gas), it is possible to further increase the D concentration of the second input gas, and thereby further increase the D concentration of the exhaust gas of M2 (second exhaust gas). Similarly, the product gas of M4 (fourth product gas) may be combined with the exhaust gas of M2 (second exhaust gas) to constitute the input gas to M3 (third input gas). In this way, particularly the D enrichment rate achieved by the entire hydrogen isotope concentrating apparatus 4 can be increased.

Figure 12:
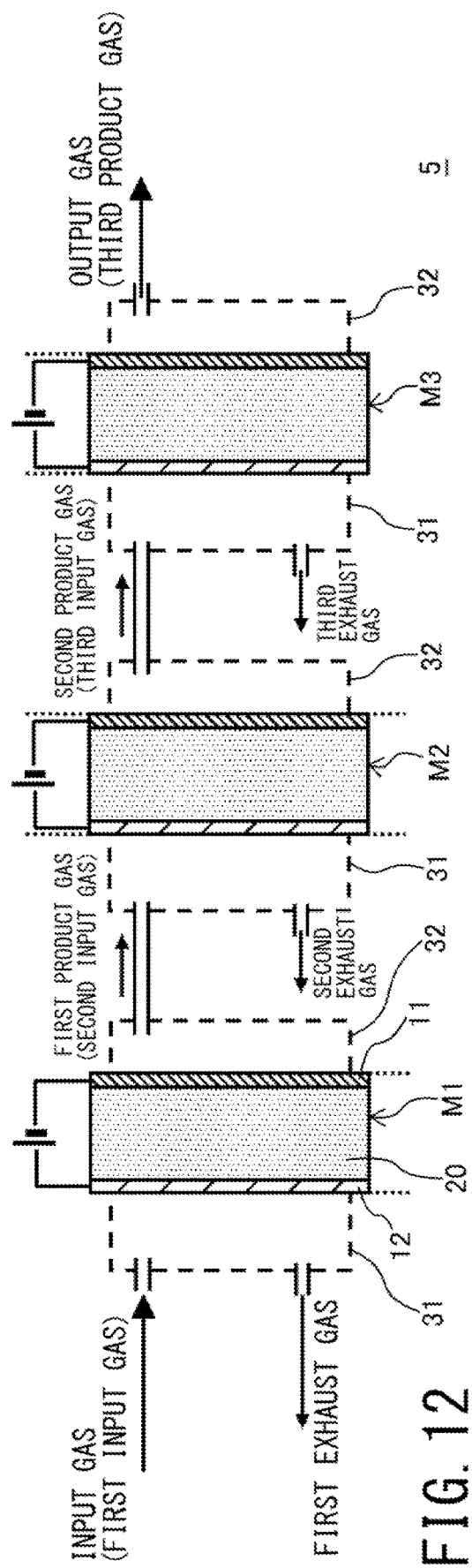
FIG. 12 is a diagram showing a configuration of a third modification of the hydrogen isotope concentrating apparatus according to the first embodiment.

Configurations each having the above-described MEA M in which the first electrode 11 is used as the cathode and the second electrode 12 as the anode, as in the case of FIG. 8 or the example 1-2, may be arranged in a multistage manner. FIG. 12 shows a configuration of a hydrogen isotope concentrating apparatus 5 (third modification) using such MEAs in three stages, in a manner of keeping correspondence to FIG. 10. There, the MEAs Mt M2 and M3 are used sequentially in this order from the left side (upstream side), an input gas before enrichment is input as an input gas (first input gas) to M1 of the first stage, and an output gas whose D concentration is finally to be highest corresponds to a product gas (third product gas) of M3 in the final stage (third stage). In the present case, in each of M1, M2 and M3, a product gas in the gas chamber 32 on the side of the first electrode 11 (cathode) is to be a gas with an increased D concentration, as described earlier.

In the present case, the cathode side gas chamber 32 of each of the MEAs is connected to the anode side gas chamber 31 in the next stage so that a product gas of M1 (first product gas) directly becomes an input gas to M2 in the next stage (second input gas) and a product gas of M2 (second product) directly becomes an input gas to M3 in the next stage (third input gas). With this configuration, it is possible to increase the D concentration of the input gas of M1 (first input gas) consecutively by M1, M2, and M3, and consequently output as the product gas of M3 (third exhaust gas).

Figure 13:
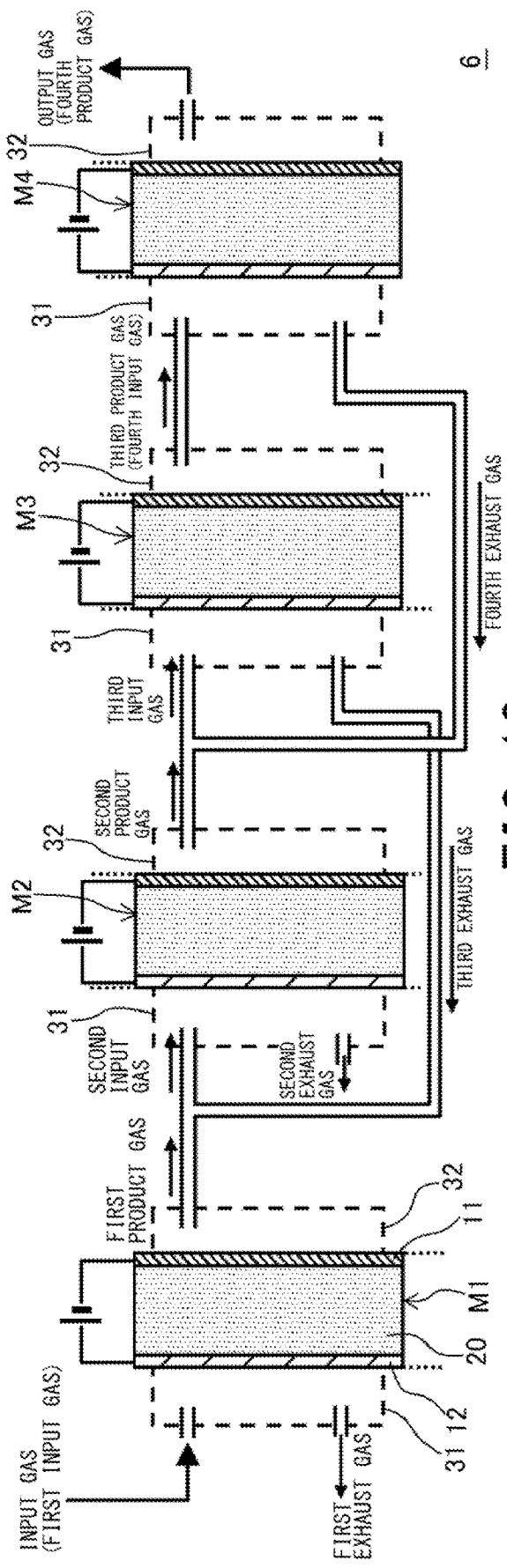
FIG. 13 is a diagram showing a configuration of a fourth modification of the hydrogen isotope concentrating apparatus according to the first embodiment.

FIG. 13 shows a configuration of a hydrogen isotope concentrating apparatus 6 (fourth modification), which is a modification of the configuration shown in FIG. 12, in a manner of keeping correspondence to FIG. 11. There, the MEAs M1 to M4 are used in this order from the upstream side (left side in the drawing), and similarly to in the above description, the cathode side gas chamber 32 of each of the MEAs M1 to M4 is connected to the anode side gas chamber 31 in the next stage so that an exhaust gas of a preceding stage becomes an input gas to the next stage. However, the present case is different in that also the product gas is used by feeding it back, similarly to in the configuration of FIG. 11.

In FIG. 13, the D concentration of the exhaust gas from a stage and that of the input gas to a stage become higher in a stage located more downstream (more right in the drawing). Accordingly, also the D concentration of the product gas inevitably becomes higher in a stage located more downstream. In that case, while the D concentration of the exhaust gas is lower than that of the input gas and of the product gas in each MEA, as described earlier, it may occur that the D concentration of the exhaust gas in a stage located more downstream becomes higher than that of the product gas in a stage preceding the more downstream one. In the configuration of FIG. 13, when the D concentration of the exhaust gas of M3 (third exhaust gas) is higher than that of the product gas of M1 (first product gas), by combining the exhaust gas (third exhaust gas) extracted from the cathode side gas chamber 31 in M3 with the product gas of M1 (first product gas), and using the combination as the input gas to M2 (second input gas), it is possible to further increase the D concentration of the second input gas, and thereby further increase the D concentration of the product gas of M2 (second product gas). Similarly, the exhaust gas of M4 (fourth exhaust gas) may be combined with the product gas of M2 (second product gas) to constitute the input gas to M3 (third input gas).

The configurations depicted in FIGS. 10 to 13 can be particularly easily realized when the above-described MEAs are used, because not only a substance (input gas) used as the input but also the exhaust gas extracted from the anode side gas chamber 31 and the product gas extracted from the cathode side gas chamber 32 are each in a gas state.

Further, in the example of FIG. 11, the product gases of M3 and M4 (third product gas and fourth product gas) are used as part of respective ones of the input gases to M2 and M4 (second input gas and third input gas), which are in the stages just preceding M3 and M4 respectively. In the example of FIG. 13, the exhaust gases of M3 and M4 (third exhaust gas and fourth exhaust gas) are used as part of respective ones of the input gases to M2 and M4 (second input gas and third input gas), which are in the stages just preceding M3 and M4 respectively. However, when a larger number of MEAs are used, a product gas (in the case of FIG. 11) or an exhaust gas (in the case of FIG. 13) may be used as part of an input gas to an MEA preceding by two or more stages the MEA producing the product gas or the exhaust gas. Such a setting may be determined according to the D concentration of the input gas, exhaust gas, and product gas of each MEA.

Further, in the above-described configurations, individual MEAs may be used as M1 to M3 (M4), but materials and thicknesses of the respective layers included in each of the MEAs each may be the same for all the MEAs. In that case, practically, M1 to M3 (M4) may be arranged in a form of different regions within a plane of a single large MEA (membrane electrode assembly base material). That is, by separating the first electrode 11 and the second electrode 12 of the single MEA into the ones for the respective regions and forming the first electrode side gas chamber 11A and the second electrode side gas chamber 12A in each of the three (four) different regions, the configurations of FIGS. 10 to 13 can be easily realized. Such configurations can be particularly easily realized because the D enrichment is performed in a gas state and at room temperature. It is also easy to use a larger number of MEAs connected with each other in a similar way.

Second Embodiment

Next, an isotope separation apparatus according to a second embodiment will be described. The isotope separation apparatus includes two membrane electrode assemblies (MEAs) in combination, and outputs an output gas obtained from an input gas in which hydrogen gas ($H_2$) and deuterium gas ($D_2$) are present together, and by concentrating D component in the input gas. A first unit using one of the MEAs functions as a fuel cell, and voltage obtained by the first unit is supplied to a second unit using the other MEA, thereby increasing the D concentration of the input gas, and consequently outputting as the output gas. Accordingly, in such D component concentration/enrichment, power supply (voltage application) from outside becomes unnecessary.

The function of the second unit is no different from the hydrogen isotope concentrating apparatuses 1 and 2 according to the first embodiment. While it accordingly is obvious that the MEA M shown in FIG. 1 may be used as the MEA used in the second unit, the MEA M may be used also in the first unit.

When the MEA M is used in the first unit (functioning as a fuel cell), in FIG. 1, there occurs a first reaction in which hydrogen H and deuterium D transfer from the side of the first electrode 11 to the side of the second electrode 12 and are combined with oxygen there, thus producing water on the side of the second electrode 12 and generating a negative potential on the first electrode 11 and a positive potential on the second electrode 12. On the other hand, when the MEA M is used in the second unit (outputting an output gas with an increased D concentration by being provided with a voltage), there occurs a second reaction in which hydrogen H and deuterium D transfer from the side of the first electrode 11 to the side of the second electrode 12 and are combined again there, thus producing a product gas containing $H_2$ and $D_2$ mixed therein.

Figure 14:
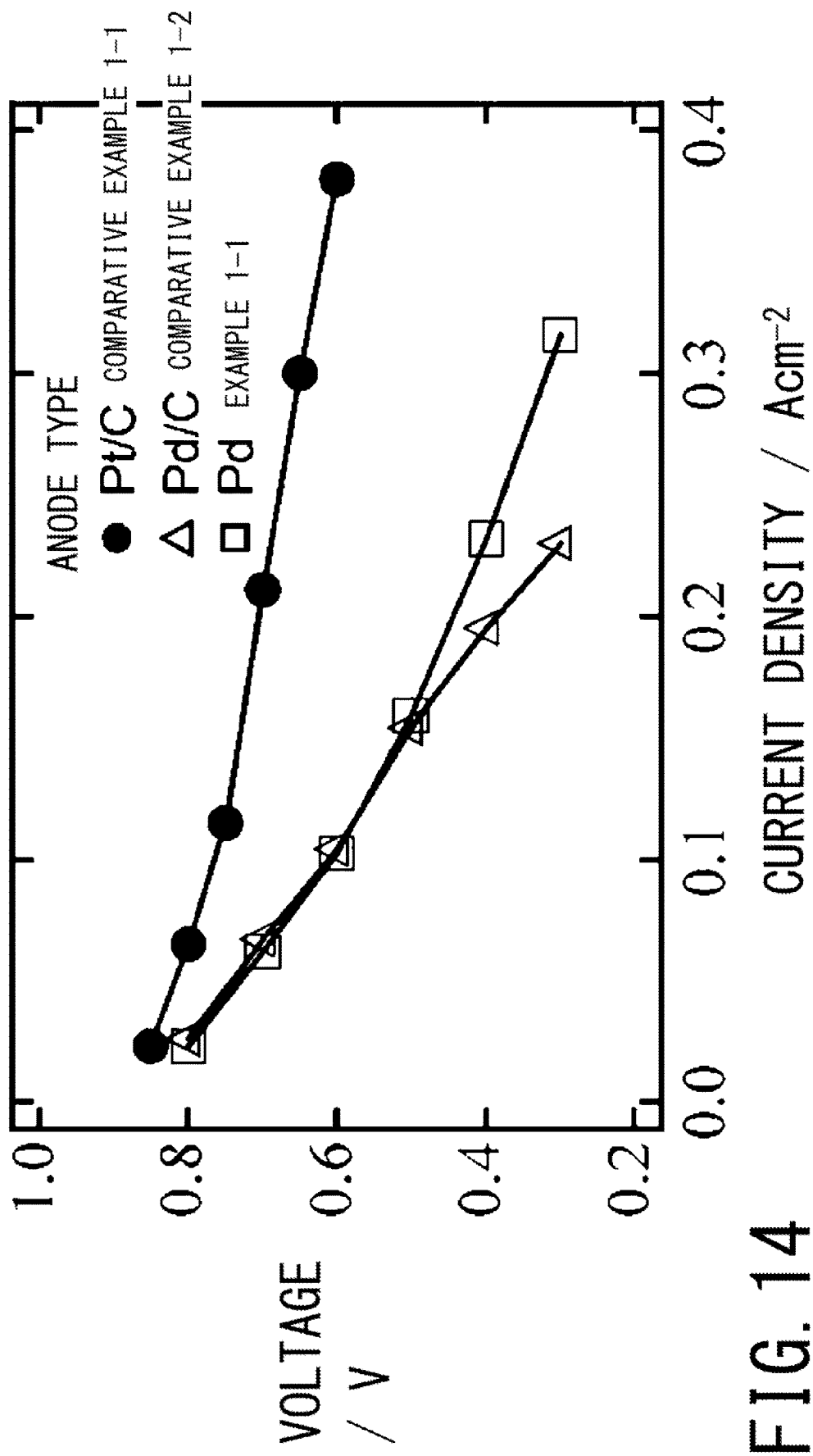
FIG. 14 shows a result of measuring power generation performance when a membrane electrode assembly in an example and comparative examples was made to function as a fuel cell.

In the first embodiment, characteristics of the MEA M when used in the second unit have already been shown. Here, a description will be given of a result of when the MEA M is used as a fuel cell and the first reaction is generated therein. In the present case, in FIG. 1, $O_2$ is introduced into the cathode side gas chamber 32 to produce water ($H_2O$ or the like) there. At that time, a DC voltage is generated between a terminal A and a terminal B, as is well known. It is also well known that, in that case, the voltage is generated to make B and A in FIG. 1 at a positive and a negative potential, respectively, but even in such the case, for convenience, the side where the input gas is supplied is referred to as the anode side gas chamber 31, and the side where the product gas is produced as the cathode side gas chamber 32, keeping the state of FIG. 1. FIG. 14 shows results of measuring a power generation characteristic (relationship of electromotive force with current density between the terminals A and B) in the present case, on the same structures as the example 1-1, the comparative example 1-1 and the comparative example 1-2 described earlier. The results indicate that, by introducing $O_2$ into the cathode gas chamber 32, all the example 1-1, the comparative example 1-1 and the comparative example 1-2 function as a fuel cell. Here, the comparative example 1-1 has the best power generation characteristic (high electromotive force and large current density), where the corresponding fuel cell is the same as that described in Patent Document 1. Also the example 1-1 and the comparative example 1-2 both using Pd function as a fuel cell, where no significant difference in the power generation characteristic is recognized between them.

Figure 15:
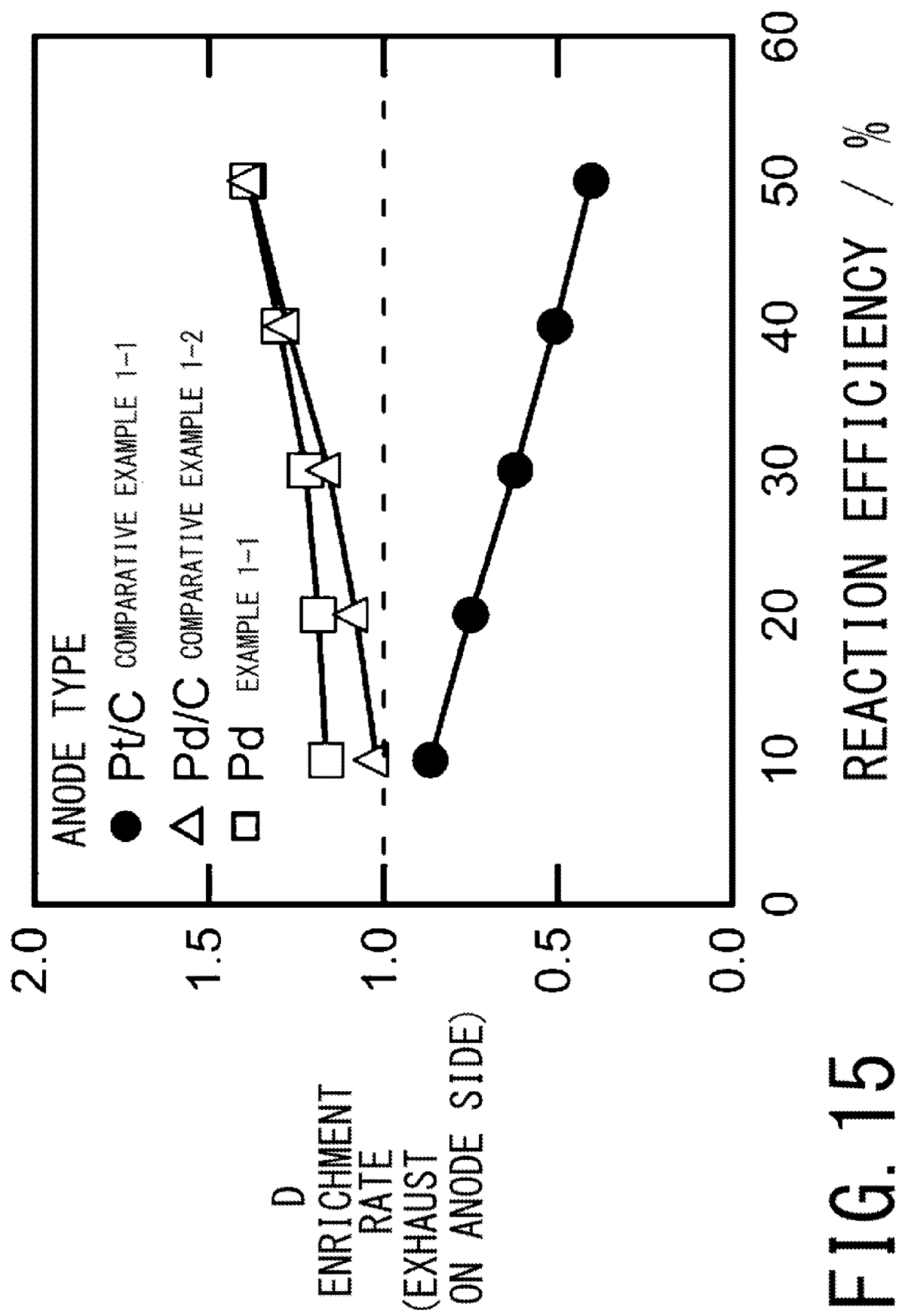
FIG. 15 shows a result of measuring a D enrichment rate when a membrane electrode assembly in an example and comparative examples was made to function as a fuel cell, varying a reaction efficiency.

Next, using the same configuration as that of FIG. 2, the D enrichment rate in the exhaust gas, in the present case, was measured. FIG. 15 shows the results. Here, a resistor was connected between the terminals A and B on the outside, and its resistance was used to adjust the current density. The reaction efficiency was converted from the current density.

The results indicate that the D enrichment rate is less than 1 in the comparative example 1-1. This indicates that, in the comparative example 1-1 (when Pt/C is used for the anode), D contributes to power generation more than H. In contrast, in the example 1-1 and the comparative example 1-2 both using Pd, D enrichment rates larger than 1 were obtained, similarly to the results of FIG. 6 (when not used as a fuel cell). That is, both when not used as a fuel cell and a voltage is applied between the terminals A and B as described above, and when used as a fuel cell generating a electromotive force between the terminals A and B, the MEA M of the example 1-1 using a Pd thin film for the first electrode 11 enables obtaining an output gas (exhaust gas) after concentrating D component in the input gas.

Figure 16:
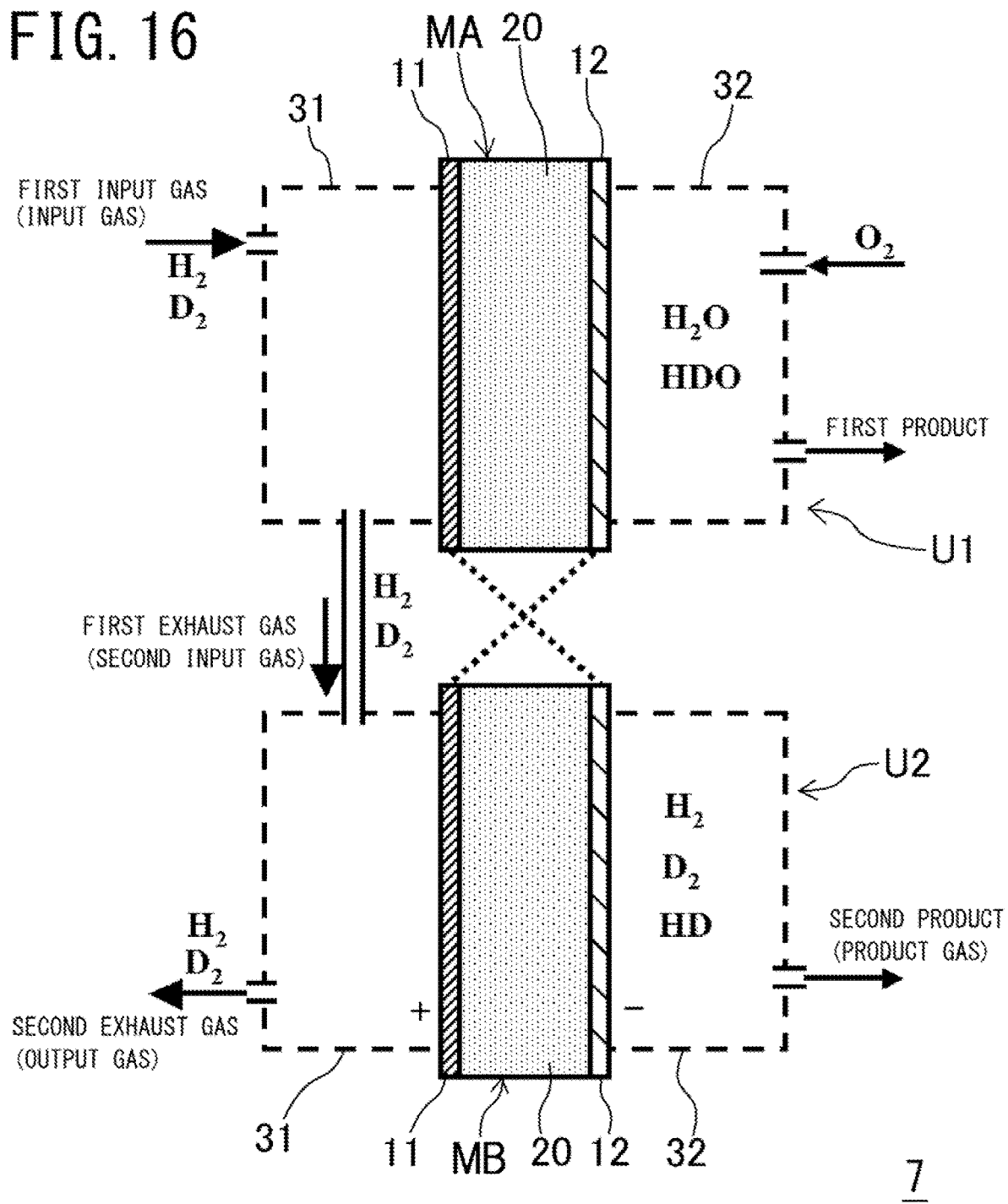
FIG. 16 is a diagram showing a configuration of a hydrogen isotope concentrating apparatus according to a second embodiment of the present invention.

According to the above results, a high-efficiency hydrogen isotope concentrating apparatus can be obtained by combining the first unit in which the MEA M using a Pd thin film for the first electrode 11 is used as a fuel cell, with the second unit using another same MEA M to which a voltage obtained in the first unit is applied. FIG. 16 is a diagram schematically showing a configuration of such a hydrogen isotope concentrating apparatus 7. There, two MEAs denoted by MA and MB having the same configuration are used in a manner of aligning in the vertical direction (in-plane direction). In each of the two MEAs, the Pd thin film, the Pt/C and Nafion, all described earlier, are used as respectively the first electrode 11, the second electrode 12 and the proton conduction layer 20.

Here, the first unit U1 on the upper side composed mainly of the MEA MA functions as a fuel cell by occurrence of the first reaction, and performs also concentrating/enrichment of D component of an input gas (first input gas) supplied to the anode side gas chamber 31 at the MEA MA. As $O_2$ is supplied from outside to the cathode side gas chamber 32 at the MEA MA, H ions and D ions having transferred from the side of the first electrode 11 to the side of the second electrode 12 produce water ($H_2O$, $D_2O$ and HDO) as a product (first product) on the side of the second electrode 12. At that time, between the first electrode 11 and the second electrode 12, an electromotive force is generated such that the first electrode 11 is set negative and the second electrode 12 is set positive. There, as H component in the first input gas selectively flows to the side of the second electrode 12, as shown in FIG. 16, a first exhaust gas in which the D/H composition ratio has been increased from that in the first input gas is extracted from the first gas chamber 31 at the MEA MA.

The second unit U2 on the lower side in the drawing composed mainly of the MEA MB functions to further increase the D concentration of the first exhaust gas. The first electrode 11 of the MEA MB is electrically connected with the second electrode 12 of the MEA MA, and the second electrode 12 of the MEA MB is with the first electrode 11 of the MEA MA. Accordingly, in the MEA MB, a voltage is applied between the first electrode 11 and the second electrode 12 similarly to in the case shown in FIG. 2. Here, in the actual configuration, Ar for supplying $H_2O$ to the proton conduction layer 20 is introduced into the atmosphere on the side of the second electrode 12, as shown in FIG. 2, but it is not illustrated in the present drawing.

The first exhaust gas with its D/H composition ratio having been increased is directly supplied as an input gas (second input gas) to the anode side gas chamber 31 at the MEA MB. Accordingly, on the side of the second electrode 12 in the MEA MB, hydrogen gas in a gas state ($H_2$, $D_2$ or HD) is produced as a product (second product: product gas). There, as H component in the second input gas selectively flows to the side of the second electrode 12, as shown in such as FIG. 4, a second exhaust gas with its D/H composition ratio having been further increased from that in the second input gas (first exhaust gas) is extracted from the anode side gas chamber 31 at the MEA MB, as a final output gas. There, as described earlier, the Pd thin film (in the example 1-1) has a smaller catalytic effect than the Pt/C (in the comparative example 1-1) and the Pd/C (in the comparative example 1-2), and it accordingly generates $D_2$ component in the first output gas and the second exhaust gas, but hardly generates HD component.

Accordingly, in the hydrogen isotope concentrating apparatus 7, using the first unit U1 and the second unit U2 but no power supply from outside, D component in the input gas can be concentrated in the two stages with high efficiency. Here, in practice, MFCs are used for controlling flow rates of the input gas and the like, as shown in FIG. 2, and the power generated by the first unit may be used also for controlling other components than the second unit U2, such as the MFCs, instead of supplying the power entirely to the side of the second unit U2.

While the MEA MA and the MEA MB are depicted in FIG. 16 as individual components connected with each other, two MEAs each having layers of the same materials and thicknesses as the respective layers in the other MEA may be used as the MEAs MA and MB. In that case, practically, the MEAs MA and MB may be arranged in a form of different regions within a plane of a single large MEA (membrane electrode assembly base material). That is, by separating the first electrode 11 and the second electrode 12 of the single MEA into the ones for the respective regions, forming the anode side gas chamber 31 and the cathode side gas chamber 32 at each of the two different regions, and providing electrical connection as shown in FIG. 16, the configuration of FIG. 16 can be easily realized. Such a configuration can be particularly easily realized because the D enrichment is performed in a gas state and at room temperature.

On the other hand, the MEAs MA and MB do not necessarily have the same configuration, as long as it is satisfied that the first unit U1 functions as a fuel cell and outputs the first exhaust gas with an increased D concentration, and that, by applying a voltage to the second unit U2, the second unit U2 can output the second exhaust gas with its D concentration having been further increased from that of the first exhaust gas. For example, from FIGS. 14 and 15, no significant difference in power generation performance and D enrichment rate is recognized between the fuel cells using, as the first electrode 11, respectively the Pd thin film (example 1-1) and the Pd/C (comparative example 1-2), and accordingly, either of the Pd thin film and the Pd/C may be preferably used as the first electrode 11 of the MEA MA. On the other hand, concerning the MEA MB, from FIG. 5, no significant difference in the performance is recognized between the Pd/C (comparative example 1-2) and the Pt/C (comparative example 1-1), but the Pd thin film (example 1-1) has a better performance than the former ones. Accordingly, for example, the configuration may be made such that the Pd/C is used as the first electrode 11 of the MEA MA, and the Pd thin film is used as the first electrode 11 of the MEA MB, where the configuration may be implemented by manufacturing the MEA MA and the MEA MB separately, forming the anode side gas chamber 31 and the cathode side gas chamber 32 at each of the MEAs, and subsequently forming gas piping as shown in FIG. 16.

As an example 2-1, the hydrogen isotope concentrating apparatus 7 having the configuration of FIG. 16 was actually fabricated using Pd/C similar to in the comparative example 1-2 for the first electrode 11 in the first unit U1 and Pd similar to in the example 1-1 for the first electrode 11 in the second unit U2, and using, as the second electrode 12 in the both units, the same Pt/C electrode as that described in the already described cases, and measurement was performed on the apparatus. There, power (voltage) supply to the second unit U2 was entirely performed by only the first unit U1, as shown in FIG. 16. In the present case, when the reaction efficiency in the first unit U1 and that in the second unit U2 were both set at 50%, the D enrichment rate obtained by the two-stage enrichment was 2.0, and it was 1.4 when the reaction efficiencies were both set at 20%. That is, with no power supply from outside, increasing the D concentration in the input gas and consequently outputting as an output gas was successfully performed.

Figure 17:
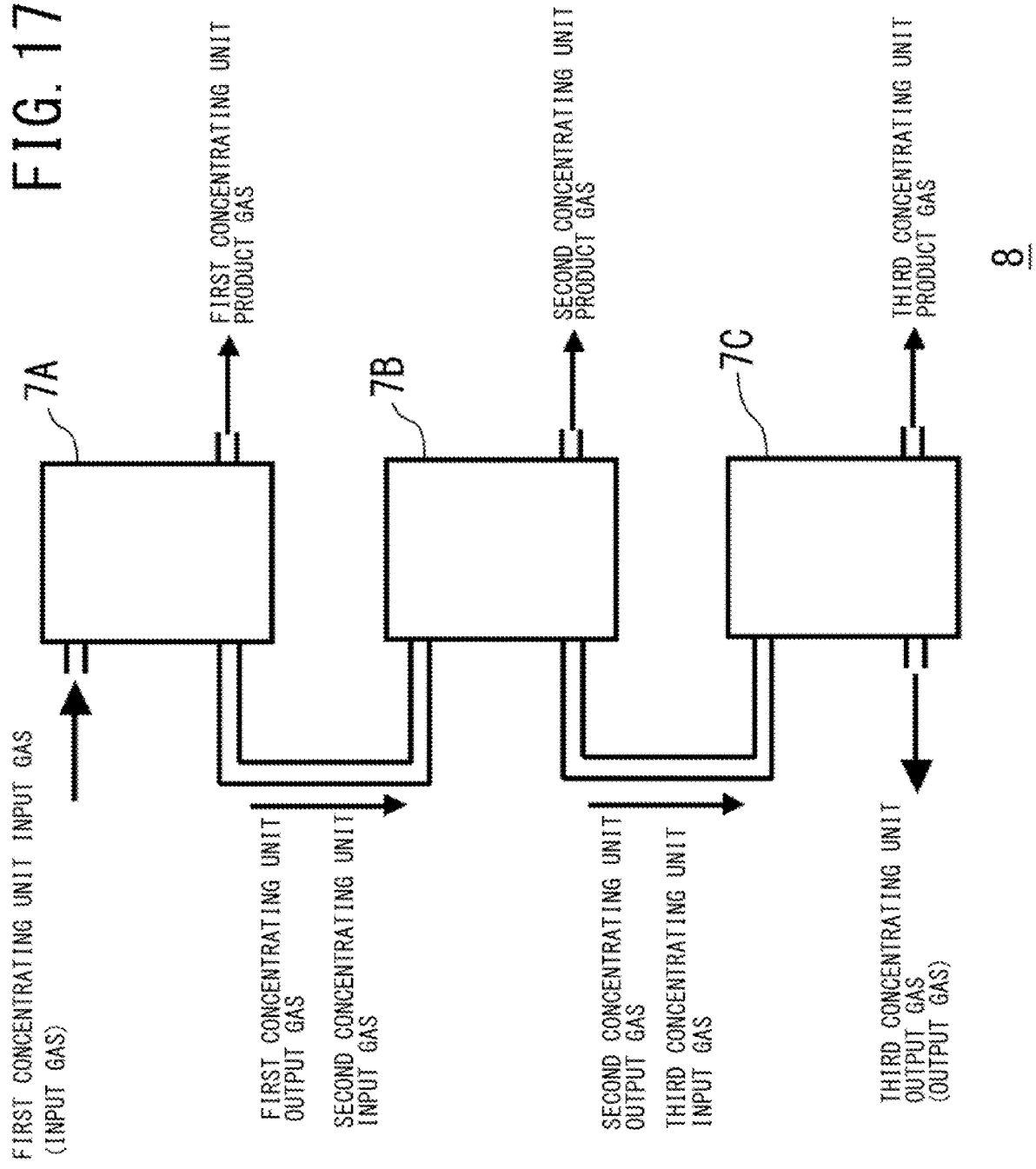
FIG. 17 is a diagram showing a configuration of a first modification of the hydrogen isotope concentrating apparatus according to the second embodiment of the present invention.

While the hydrogen isotope concentrating apparatus 7 is configured, in the example of FIG. 16, by using the first unit U1 (MEA MA) and the second unit U2 (MEA MB) in combination, a plurality of units each corresponding to the hydrogen isotope concentrating apparatus 7 may be combined in a multistage manner to obtain a hydrogen isotope concentrating apparatus having higher efficiency. FIG. 17 is a diagram showing a configuration of a hydrogen isotope concentrating apparatus 8 corresponding to a first modification configured as just described. There, three enrichment units 7A to 7C each have the same configuration as that of the hydrogen isotope concentrating apparatus 7 of FIG. 16. That is, the enrichment unit 7A is provided with the MEA MA accompanied by the anode side gas chamber 31 and the cathode side gas chamber 32, and with the MEA MB accompanied by the anode side gas chamber 31 and the cathode side gas chamber 32. Accordingly, for example, in the enrichment unit 7A, as shown in FIG. 16, the first input gas is input as an input gas to its first stage, and the second exhaust gas is output as an output gas with its D concentration having been increased from that of the input gas. Here, such an input gas and an output gas in the enrichment unit 7A are respectively referred to as a first enrichment unit input gas and a first enrichment unit output gas, such an input gas and an output gas in the enrichment unit 7B are respectively referred to as a second enrichment unit input gas and a second enrichment unit output gas, and such an input gas and an output gas in the enrichment unit 7C are respectively referred to as a third enrichment unit input gas and a third enrichment unit output gas.

In FIG. 17, the first enrichment unit output gas is used as the second enrichment unit input gas, and the second enrichment unit output gas is used as the third enrichment unit input gas. That is, the output gas of the enrichment unit in a preceding stage is used as the input gas to the enrichment unit in a stage just following the preceding one. As a result, when the input gas to the entire hydrogen isotope concentrating apparatus 8 is set to be the first enrichment unit input gas and the third enrichment unit output gas is taken as the output gas from the entire apparatus, D component can be concentrated with high efficiency. The enrichment units are used in three stages in the example of FIG. 17, but a larger number of enrichment units may be used in a similar way.

Figure 18:
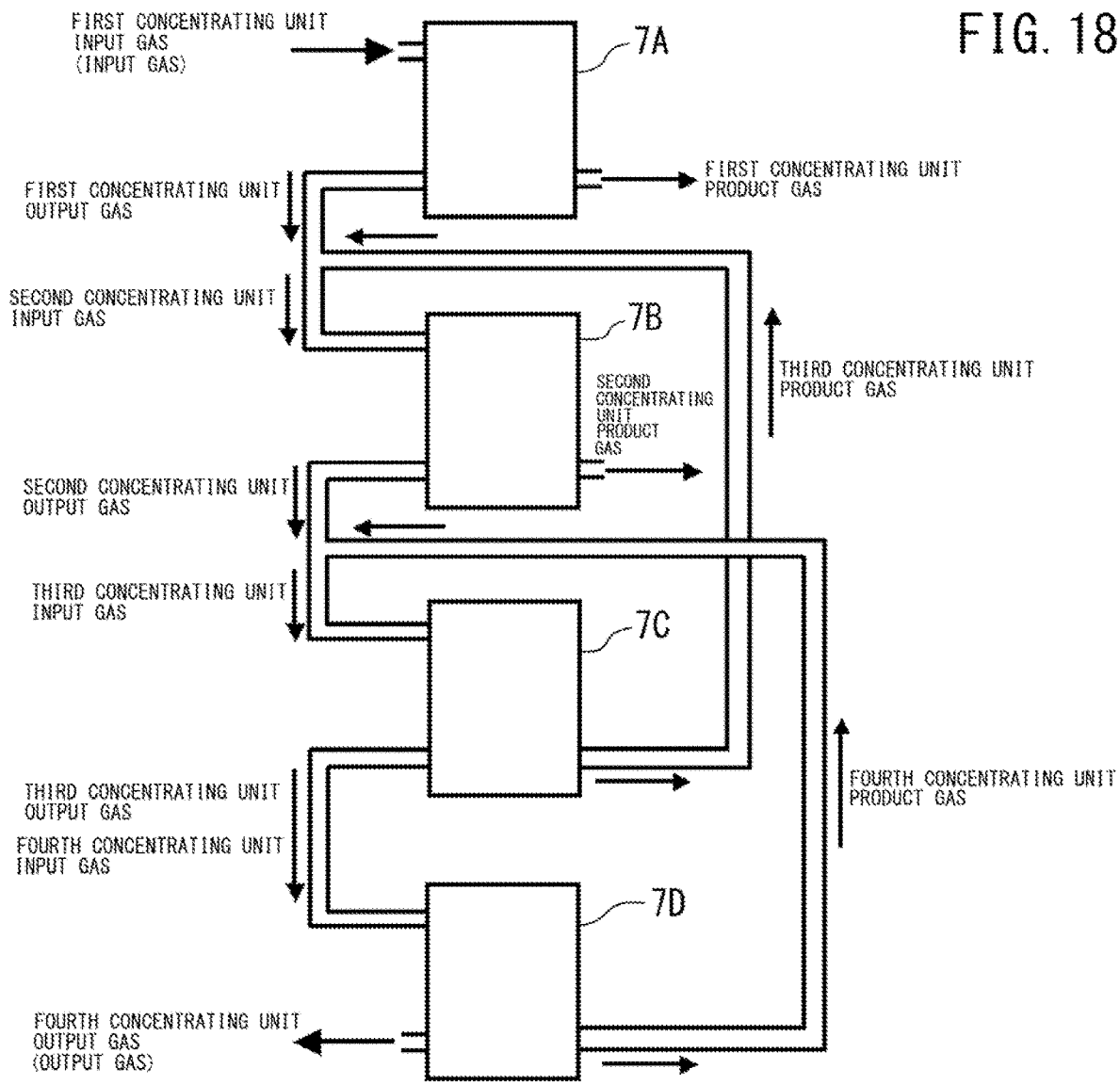
FIG. 18 is a diagram showing a configuration of a second modification of the hydrogen isotope concentrating apparatus according to the second embodiment of the present invention.

FIG. 18 shows a configuration of a hydrogen isotope concentrating apparatus 9 corresponding to a further modification of the hydrogen isotope concentrating apparatus 8 (second modification). There, four enrichment units 7A to 7D each having a similar configuration to that of the hydrogen isotope concentrating apparatus 7 are used. In addition, also similarly to in the configuration of FIG. 17, the first enrichment unit output gas is used as the second enrichment unit input gas, the second enrichment unit output gas is used as the third enrichment unit input gas, and the third enrichment unit output gas is used as a fourth enrichment unit input gas. That is, the output gas of the enrichment unit in a preceding stage is used as the input gas to the enrichment unit in a stage just following the preceding one.

When the enrichment units are thus connected in series to increase the D concentration in a multistage manner, the D concentration of the input gas to an enrichment unit and that of the output gas from an enrichment unit each become higher in an enrichment unit located more downstream (lower in the drawing). Accordingly, also the D concentration of the product gas in an enrichment unit inevitably becomes higher in an enrichment unit located more downstream. In that case, while the D concentration of the product gas is lower than that of the input gas and of the exhaust gas (output gas) in each of the enrichment units, as described earlier, it may occur that the D concentration of the product gas in a stage located more downstream becomes higher than that of the exhaust gas (output gas) in a stage preceding the more downstream one. In the configuration of FIG. 18, when the D concentration of the third enrichment unit product gas, which is the product gas of the third enrichment unit, is higher than that of the first enrichment unit product gas, by combining the third enrichment unit product gas with the first enrichment unit product gas, and using the combination as the second enrichment unit input gas, it is possible to further increase the D concentration of the second enrichment unit input gas, and thereby further increase the D concentration of the output gas of the second enrichment unit 7B (second enrichment unit output gas). Similarly, the product gas of the enrichment unit 7D (fourth enrichment unit output gas) may be combined with the output gas of the second enrichment unit 7B (second enrichment unit output gas) to constitute the input gas to the third enrichment unit 7C (third enrichment unit input gas).

The configurations depicted in FIGS. 17 and 18 can be particularly easily realized because the above-described MEAs are used therein, and not only a substance (input gas) used as the input but also the exhaust gas extracted from the anode side gas chamber 31 and the product gas extracted from the cathode side gas chamber 32 are each in a gas state.

In the example of FIG. 18, the product gases of the third enrichment unit 7C and the fourth enrichment unit 7D (third product gas and fourth product gas) are used as part of respective ones of the input gases to the second enrichment unit 7B and the third enrichment unit 7C (second enrichment unit input gas and third enrichment unit input gas), which are respectively in the just preceding stages. However, when a larger number of enrichment units are used, a product gas may be used as part of an input gas to an enrichment unit preceding by two or more stages the enrichment unit having produced the product gas. Such a setting may be determined according to D concentration values of the input gas, output gas and product gas of each enrichment unit.

As described earlier, in the hydrogen isotope concentrating apparatus 7 of FIG. 16, the MEA MA and the MEA MB used therein may be formed on a common membrane electrode assembly base material. In the hydrogen isotope concentrating apparatuses 8 and 9, all MEAs in all enrichment units used therein may be similarly formed on a common membrane electrode assembly base material. Such a configuration can be particularly easily realized because the D enrichment described above is performed in a gas state and at room temperature.

As described earlier, particularly as the MEA MB in the second unit U2, a similar MEA to the MEA M in the first embodiment may be used. Accordingly, in the MEA MB, use of a material other than Pd, such as V, Ta, and Ti, for the first electrode 11 and providing a single atomic layer graphene between the first electrode and the proton conduction layer similarly may be adopted, Further, use of the first electrode 11 as the cathode and the second electrode 12 as the anode similarly may be adopted. In that case, the electrical connection between the first unit and the second unit in FIG. 16 is reversed, and a gas having an increased D concentration is output from the side of the cathode gas chamber 32 in the second unit.

While. in the examples described above, the descriptions have been given of selective enrichment of deuterium component from a gas in which deuterium ($^2$H, D) is mixed with hydrogen ($^1$H, H), it is theoretically obvious that tritium ($^3$H, T) can be concentrated similarly. It is also the same for other hydrogen isotopes.

REFERENCE SIGNS LIST

1 to 9 hydrogen isotope concentrating apparatus
7A to 7D enrichment unit
11 first electrode
12 second electrode
20 proton conduction layer
31 anode side gas chamber
32 cathode side gas chamber
101 to 104 mass flow controller (MFC)
105 bubbler
110 evacuation system
120 Q-mass (quadrupole mass spectrometer)
M, M1 to M4, MA, MB membrane electrode assembly (MEA)
U1 first unit
U2 second unit

What is claimed is:

1. A hydrogen isotope concentrating apparatus for outputting an output gas obtained from an input gas in which hydrogen ($^1$H) and a hydrogen isotope, which is an isotope of the hydrogen, are mixed, the output gas having an increased concentration ratio of the hydrogen isotope to the hydrogen than in the input gas, the hydrogen isotope concentrating apparatus comprising a membrane electrode assembly having:

a proton conduction layer made of a proton conductor to conduct positive ions of hydrogen and having two principal surfaces opposing each other;

a first electrode formed on one of the principal surfaces of the proton conduction layer;

and a second electrode formed on the other one of the principal surfaces of the proton conduction layer, wherein, in the membrane electrode assembly, a DC voltage is applied between the first electrode and the second electrode, the hydrogen and the hydrogen isotope in the input gas that is in contact with one of the first and second electrodes set to be an anode flow between the first and second electrodes, a product gas is produced at the other one of the first and second electrodes set to be a cathode, and between the product gas and an exhaust gas corresponding to the input gas after consumption of the hydrogen and the hydrogen isotope for producing the product gas, one having an increased concentration of the hydrogen isotope is extracted as the output gas, wherein the first electrode is uniformly made of a film of a hydrogen permeable metal selected from one of palladium (Pd), vanadium (V), tantalum (Ta) and titanium (Ti), wherein the second electrode is made of Pt/C catalyst, in which Pt particles are supported on carbon particles.

2. The hydrogen isotope concentrating apparatus according to claim 1,
wherein
the film is an evaporated film of the hydrogen permeable metal.

3. The hydrogen isotope concentrating apparatus according to claim 1,
wherein
a positive potential and a negative potential are applied to the first electrode and the second electrode, respectively, and
the exhaust gas is taken as the output gas.

4. The hydrogen isotope concentrating apparatus according to claim 1,
wherein
a positive potential and a negative potential are applied to the second electrode and the first electrode, respectively, and
the product gas is taken as the output gas.

5. The hydrogen isotope concentrating apparatus according to claim 1,
wherein
the first electrode and the proton conduction layer are in contact with each other across a single atomic layer graphene.

6. The hydrogen isotope concentrating apparatus according to claim 1,
wherein
a plurality of the membrane electrode assemblies are used in a multistage manner from inputting the input gas to outputting the output gas, and
the output gas from the membrane electrode assembly in a preceding stage is used as the input gas to the membrane electrode assembly in a following stage adjacent to the preceding one.

7. The hydrogen isotope concentrating apparatus according to claim 6,
wherein
between the exhaust gas and the product gas of one of the membrane electrode assemblies, one that has not been taken as the output gas is used as the input gas to a membrane electrode assembly in a stage just preceding that of the one of the membrane electrode assemblies.

8. The hydrogen isotope concentrating apparatus according to claim 6,
employing a membrane electrode assembly base material provided with the first electrode, the second electrode and the proton conduction layer,
wherein
the plurality of the membrane electrode assemblies are formed as different regions within a plane in a single body of the membrane electrode assembly base material.

9. The hydrogen isotope concentrating apparatus according to claim 1,
wherein
the hydrogen isotope is deuterium ($^2$H or D) or tritium ($^3$H or T).

* * * * *